US012580519B2

(12) United States Patent
Torres et al.

(10) Patent No.: US 12,580,519 B2
(45) Date of Patent: Mar. 17, 2026

(54) SOLAR TRACKING SYSTEM WITH A MECHANICAL DRIVE MECHANISM USING A FLEXIBLE TRANSMISSION SHAFT

(71) Applicant: Soltec Innovations S.L., Molina de Segura (ES)

(72) Inventors: Raúl Morales Torres, Molina de Segura (ES); Ignacio Melon Menéndez, Molina de Segura (ES); Bernd Zwingmann, Molina de Segura (ES); Angela Bermejo Rosique, Molina de Segura (ES)

( * ) Notice: Subject to any disclaimer, the term of this patent is extended or adjusted under 35 U.S.C. 154(b) by 0 days.

(21) Appl. No.: 18/829,147

(22) Filed: Sep. 9, 2024

(65) Prior Publication Data

US 2025/0088142 A1     Mar. 13, 2025

Related U.S. Application Data

(60) Provisional application No. 63/581,594, filed on Sep. 8, 2023.

(51) Int. Cl.
H02S 20/32          (2014.01)
(52) U.S. Cl.
CPC ..................................... H02S 20/32 (2014.12)
(58) Field of Classification Search
CPC ...................................................... H02S 20/32
See application file for complete search history.

(56) References Cited

U.S. PATENT DOCUMENTS 6,058,930 A      5/2000  Shingleton
2014/0338659 A1*  11/2014  Corio ..................... F24S 30/428
126/714

FOREIGN PATENT DOCUMENTS

WO      WO2020056970      *   3/2020

* cited by examiner

*Primary Examiner* — Jayne L Mershon
(74) *Attorney, Agent, or Firm* — Greenberg Traurig, LLP

(57)          ABSTRACT

A solar tracking system with torsion tubes having solar panels (modules) mounted thereon. Columns support the system and have bearings for rotation of the torsion tubes. A flexible transmission shaft is connected at one end to a mechanical drive mechanism for rotating the torsion tubes and thereby rotating at least an individual row of modules to follow the sun's diurnal motion. The torsion tubes can be rotated in an opposite direction, or backtrack, to prevent shadowing from one individual row of modules to another. The flexible transmission shaft is connected to a single motor at its other end and is constructed of flexible materials to compensate for misalignment due to uneven terrain or staggered row of module configuration. Dampers are also employed and affixed to the row of modules to decouple wind forces imposed on the row of modules.

17 Claims, 12 Drawing Sheets

110

112

22

24

112

24

22

130

112

136

112

SOLAR TRACKING SYSTEM WITH A MECHANICAL DRIVE MECHANISM USING A FLEXIBLE TRANSMISSION SHAFT

CROSS-REFERENCE TO RELATED APPLICATIONS

Not Applicable.

BACKGROUND OF THE INVENTION

Field of the Invention and Description of Related Art

The present invention relates to solar energy production, and more specifically, to a system, method, and apparatus, for constructing a single axis solar tracking system that follows the diurnal motion of the sun.

Solar tracking systems utilized in renewable energy production are devices that track, or concentrate towards, rotate or translate with, the motion of the sun relative to the earth to maximize an angle of incident between the incoming sunlight and the solar panels of the system (referred to herein as "modules"). In some embodiments, the plurality of modules within the solar tracking system may maximize the production of solar energy. For example, the plurality of modules of the solar tracking systems are caused to move by the solar tracking system to ensure that the plurality of modules face the sun as the sun moves in the sky from east to west. This movement of the plurality of modules ensures the modules remain in a substantial perpendicular orientation to the sun, in either one or two axes. The presently claimed invention applies to the plurality of modules for generating electrical power but may be applied to any solar energy collection device, such as a solar thermal device or one or more exposure testing devices.

Typical solar tracking systems may refer to a device that orients a solar panel or a solar reflector toward the sun. In some embodiments, there are multiple types of solar tracking systems such as single-axis trackers, dual-axis trackers, active trackers, passive trackers, and chronological trackers. The single-axis tracker system may include a system that rotates on one axis aligning the solar panels from east to west, where single-axis tracker systems can increase energy output by approximately 20-30% compared to fixed solar panels. The dual-axis tracker system may include a system that rotates on tow axes, where dual-axis tracker systems can increase energy output by up to 40% compared to fixed installations. The active tracker system may use motors and gear trains to precisely adjust the position of the solar panels based on the position of the sun, where sensors and control systems are employed to continuously adjust the orientation. The passive tracker system may use the thermal expansion properties of materials to move the panels, which do not require motors or sensors. The chronological tracker system may use a pre-programmed algorithm to move the panels based on the time of day and the expected position of the sun but does not rely on sensors to follow a schedule.

The plurality of modules within the solar tracking system may be coupled to a plurality of torsion bars to form a plurality of module rows, which make up an array of modules (referred to herein as "array"). The torsion bars typically run horizontally (in a north/south direction). In certain embodiments, the torsion bars may run parallel to the ground in case of a north/south slope. In some embodiments, the plurality of torsion bars may provide structural integrity and stability while allowing movement of the plurality of modules within the solar tracking system. In certain embodiments, the plurality of torsion bars may provide the structural integrity and stability via absorbing and distributing a mechanical load associated with the solar tracking system and stresses that occur during the tracking movements. In certain embodiments, the plurality of torsion bars may serve as a primary rotational axis around which the plurality of modules moves, where the plurality of torsion bars provide a smooth and controlled means for the plurality of modules to rotate and track the path of the sun. In some embodiments, the energy gain provided by the modules of the solar tracking system, depends heavily on the tracking geometry of the system, the location of the installation, and the weather conditions at the installation site.

There are many types of solar tracking system geometries where a mechanical drive mechanism is disposed at the end of the row of modules arranged in an array to move synchronously, and at a desired pitch, or tilt angle, in reference to the ground or some other horizontal plane. A dual axis tracking system keeps the collector perpendicular to the sun in both axis' and provides the greatest gain in energy production at any location. Single axis tracking systems are fixed in one axis and typically track the daily motion of the sun in the other axis. Single axis tracking system geometries include: single axis tilt and roll, single axis substantially horizontal, and single axis fixed tilt azimuth geometries.

Single axis tilt and roll tracking systems are tilted as a function of the location's latitude and follow the sun's daily motion about that tilted axis. Single axis azimuth tracking systems are tilted at an optimum angle and follow the sun's daily motion by rotating about a vertical axis. Single axis substantially horizontal tracking systems are configured parallel to the ground and rotate about a north/south horizontal axis to follow the sun's daily motion.

All solar tracking systems must be built strong enough to resist the wind forces in any tracking position or be "stowed" in a safety position to reduce the effect of extreme wind forces. The plurality of modules may also require periodic cleaning, which in many locations is primarily accomplished by rain "washing" the plurality of modules and/or mechanical brush cleaning. Snow can impact the solar tracker control operations, due to the occurrence of ice or the weight of snow on the modules, or due to snowdrifts that can interfere with solar tracking system's movement and collection of solar energy. In addition, construction materials, electronics, drive components, and motors employed by the solar tracking system may also be able to operate within temperature and climate constraints.

In many applications, the single axis substantially horizontal tracking system offers the most cost-effective solar tracking system geometry. A single axis substantially horizontal tracking system structure may be supported at many points along the rotating axis and therefore requires less complexity, and less material for construction, than other solar tracking system geometries, that usually require more mechanical drive mechanisms and support columns per module. The key to a successful design of a solar tracking system is to provide the maximum overall economic solar energy gain or recovery benefit when considering many factors such: initial apparatus cost, installation cost, land utilization, cost and efficiency of the modules, operation, and maintenance costs, as well as the efficiency in energy gain or recovery provided by the solar tracking system geometry. As the cost of steel, and other fabrication material rises, the single axis substantially horizontal solar tracking system geometry may become a desirable geometry in case of a favorable ratio between direct sun light and diffused sun light, where tracking provides more energy during the day, especially in morning hours and evening hours. In certain embodiments, the single axis substantially horizontal solar tracking system geometry may keep the modules at a relatively low profile to the foundation, and at a minimum overhung moment load relative to the rotating axis, without requiring special connections to rotate the system substantially about its center of gravity (i.e., the rotation of the module is typically offset from its the center of gravity and can be offset as much as 100 to 200 mm.)

The single axis substantially horizontal solar tracking systems may connect each row of modules together with a linear motion linkage in an effort to minimize the number of drive motors required. The prior art also requires a separate, large foundation, or multiple foundations, necessary to anchor the mechanical drive mechanism, rendering it capable of resisting high forces induced by the wind, and capable of rotating many rows of modules in the array with a linear motion motor. Moreover, the prior art requires each row to individually resist when using slew drives, but the wind load is not transferred from one row to another. When using a push/pull bar to connect the rows, parts of the wind load (torque moment) accumulate within several rows and must be resisted by the drive system. Each module is made of many photo-voltaic cells, and the most common sizes are known as 60-cell module and 72-cell module versions, among others. Examples of single axis substantially horizontal solar tracking systems in the prior art, are described in U.S. Pat. No. 6,058,930, to Shingleton, and U.S. Pat. No. 8,459,249, to Corio. In these prior art solar tracking systems, a single axis substantially horizontal row of modules is linked together with a linear motion linkage and operated by a single linear actuator attached to a separate, and large, foundation. Also, the prior art systems generally require flat, level, or graded, terrain for proper operation of the system. Many support columns must be installed at height elevations, and locations, requiring high tolerance within 100+ columns, across two dimensions in a large area, for the mechanical linkages between the rows of modules to line up for proper operation of the system. This often requires extensive and costly site preparation. Some of the prior art single axis substantially horizontal solar tracking systems allow for installation on undulating, or uneven, terrain, but these systems require expensive joints that must be fabricated onsite that are used to resist the high forces induced by the wind. To combat these high force loads, pivotal joints are generally complicated and expensive to construct. Another disadvantage of the prior art single axis substantially horizonal solar tracking systems is that they are designed as large rectangles with the mechanical linkage running down the center of the array. If the installation site is not suitably in the shape of a rectangle, these systems are often employed in less than optimum configurations where fewer modules are controlled by the centralized mechanical linkage. This is yet another cost increase factor for the prior art systems.

The linear motion mechanical linkages of the prior art solar tracking systems represent an excess of material and many labor-intensive installation. The mechanical linkages must be robust, to directly resist the force of an entire field of many rows of modules in the array to one large linear mechanical drive mechanism that must be affixed to a large separate linear actuator drive foundation. The flexibility in site layout is also impacted by the linear mechanical motion linkage since the mechanical drive mechanism connections must run generally centered in the rows and be installed in a straight perpendicular line. As such, the mechanical linkage mechanisms of the prior art must be fixed at a right angle to the modules and cannot deviate from a perpendicular orientation where one linear actuator for several rows is used, and therefore do not allow the solar tracking systems to conform to irregular site installation boundaries, which may cause a misalignment of the mechanical linkages. The solar tracking systems of the prior art also use worm gear mechanical drive mechanisms. However, these worm gear mechanical drive mechanisms employ inflexible transmission shafts with articulating joints in order to obtain the required degree of flexibility in the angle for the mechanical linkages between mechanical drive mechanisms.

Solar tracking system geometries, other than the substantially horizontal single axis solar tracking systems, require more land area for installation. All of the solar tracking geometries, except for the horizontal single axis solar tracking system geometries, may be spaced in two dimensions, east/west and north/south, so that the plurality of modules does not shade each other. Substantially horizontal single axis solar tracking systems need only be spaced apart in the east/west dimension to alleviate shading and therefore require much less land to implement. The installation costs of most substantially horizontal single axis solar tracking systems highly depend on the site, as land contour, and shape, critically control installation cost.

One type of substantially horizontal axis solar tracking system is not linked together and typically includes multiple modules mounted astride a torsion tube. These systems are designed as independently motor driven rows. In some embodiments, the plurality of modules within these systems are driven individually by a motor and mechanical drive mechanism and the array may be rotated substantially about the center of gravity of the system. In certain embodiments, the array may be rotated with an offset from the center of gravity for the modules. Rotating the array substantially about the center of gravity for the plurality of modules may eliminate the moment mechanical loads are applied to the mechanical drive mechanism by the overhung weight of the plurality of modules. However, in order to substantially rotate the array about the center of gravity, the substantially horizontal solar tracking system design requires costly structural materials, torsion tubes, torsion tube connections, and bearings that project a higher wind area, where the area depends on the quantity of modules used. Other disadvantages of this particular solar tracking system design includes: a higher projected wind area, requiring more structural material and a large foundations to resist greater moment loads; a larger capacity mechanical drive mechanism to overcome moment loading from the modules that are mounted at a larger distance from the torsion tube due to the taller profile of the array; more complex bearings and support points, or columns, for rotating the modules substantially about the center of gravity of the system's modules; and the use of a motor per every row of modules to increase the maintenance costs for the system.

In some embodiments, the array within the solar tracking system may refer to a plurality of photovoltaic modules that collect sunlight and convert the collected sunlight into electricity. Within the array, the plurality of modules may be electrically interconnected to produce a combined output and can be tailored to meet specific voltage and current requirements for the solar tracking system. In certain embodiments, the array of the solar tracking system may be integrated with other system components such as inverters, batteries, and/or monitoring systems.

In some embodiments, the solar tracking system may refer to a tilt and roll solar tracking system. A tilt and roll solar tracking system, is tilted in elevation, and rotates about the tilted axis. This system typically offers increased energy gain over substantially horizontal single axis solar tracking systems but comes with added costs that should be critically analyzed prior to deployment. In addition, such systems may not be capable of automatic stow during high winds since the elevation angle is fixed and therefore requiring the system to be built to be structurally capable of withstanding all sorts of high wind forces.

In some embodiments, the solar tracking system may refer to a fixed tilt azimuth solar tracking system. A fixed tilt azimuth solar tracking system may be tilted in elevation and rotates about a vertical axis. Although typically more structurally stable than a tilt and roll solar tracking system, the solar tracking system may suffer from the same cost drawbacks as the tilt and roll solar tracking system design. However, the performance in energy gain may make this system geometry more economical for some installations.

A dual-axis solar tracking system geometry provides the greatest performance in energy recovery, or gain, over all the aforementioned solar tracking system geometries, because the system keeps the modules perpendicular to the sun in both axes. One advantage of single axis substantially horizontal solar tracking system, in comparison to dual-axis solar tracking system, is that more modules can be mounted per drive system (worm gear drive, linear drive, etc.). Thus, system cost per module is typically lower. However, the dual-axis solar tracking system geometry has several practical disadvantages that include: a large land requirement due to the spacing necessary for shading in two dimensions; a more complex structure requiring more structural materials as a result of increased projected height from the earth and foundation; the need for a second drive axis for elevation, further increasing complexity, expense and maintenance issues; and the use of two drive motors per a relatively small surface area of modules, which results in increased installation, and subsequent maintenance, costs.

A prior art tracking system may be composed of several modules, each connected to worm gear drive mechanisms that are coupled to a single motor for use in driving inflexible, or rigid, transmission shafts. To compensate for any misalignment between the plurality of modules (e.g., due to their nominal position), or installation tolerances, where each inflexible transmission shaft may be equipped with articulated joints at both ends. In some embodiments, heavy foundations for the motor are also not needed as they are used to connect the adjacent modules making up the array. In all of the foregoing solar tracking geometries, a rotating inflexible transmission shaft is used to connect the adjacent modules. The rotation of the inflexible transmission shaft is powered by a single motor. The inflexible transmission shaft is connected to a mechanical drive mechanism, typically containing a worm gear drive. The worm gear drive may, in turn, rotate a torsion tube and cause the plurality of modules to move in unison, along a common axis and at a desired pitch, to synchronously follow the sun. In some embodiments and depending on the geological location of the of the array of modules, the inflexible transmission shaft and torsion tubes may need to withstand various types of environments. For example, the plurality of modules must be constructed of a material to support a structure to carry, and withstand, deflection forces (i.e., bending between adjacent modules within the plurality of modules) and torsion forces (i.e., torques provided by the motor and mechanical drive mechanism). In some embodiments, the size and complexity of the torsion tube may be increased for larger arrays and/or increased incidences of wind loading. In addition to the torque and deflection forces produced by the environment, the support structure may accommodate the bending and torsion forces exerted on the inflexible transmission shaft and torsion tube due to: any misalignment between the support structures due to grading differences of the terrain; wind and weight loadings of the modules, which are problematic for the torsion tubes; and the drive torque of the motor. To address the previously described concerns, the inflexible transmission shaft is constructed of flexible connections to allow for misalignment between rows, in order to provide for the adequate resistance needed for the deflection and torsion loadings the solar tracking system may undergo.

Presently, the inflexible transmission shafts are typically formed from rigid and/or solid tubes made of a metal, metal alloy (e.g., steel), a polymer, an aramid fiber, a natural fiber (e.g., cotton, hemp, leather, etc.), and/or any material that may be cold formed with longitudinal welding in a production line or are warm formed without welding. In certain embodiments, the inflexible transmission shafts may be made of steel and aluminum. Furthermore, due to variations in spacing between the plurality of modules in the rows of the array, the inflexible transmission shafts are typically desired to telescope up to 29 inches. In certain embodiments, the telescoping of these rigid and/or solid inflexible transmission shafts may face imperfections and constructing complications with mating the end surfaces of the inflexible transmission shafts. Undesirable amounts of lash may be present due to the variations of galvanized coating thickness of the inflexible transmission shaft. Also, the large clearances between the parts of the inflexible transmission shaft further result in increasing the lash. Finally, since multiple inflexible transmission shafts are designed to work together in a row of modules of the array, controllability issues can also result from the lash.

SUMMARY OF THE INVENTION

Disclosure of the Invention

An object of the presently claimed invention is to link a plurality of modules of a solar tracking system in a large array configuration, to operate in unison, at a common desired tilt angle, and may be driven by a single motor operated by a tracker controller, whereby the system is favorably designed to be capable of withstanding various types of environments.

Another object of the presently claimed invention is to develop a solar tracking system for a large array configuration capable of carrying, withstanding, and deflecting, torsion forces on the system (i.e. forces provided by the wind), and torsion forces exerted on the motor, flexible transmission shafts, and torsion tubes, that may be caused by a misalignment between the support structures supporting the solar tracking system due to grading differences of the terrain, or surface, and installation tolerances, where the array is located.

A further object is to apply one or more drive principals to the various types of solar tracking system geometries to maximize an economic energy recovery, and/or optimize performance for each solar tracking system application.

Flexible transmission shafts are presently claimed in the invention and have been discovered to advantageously support a mechanical driving mechanism for a multiple substantially horizontal single axis solar tracking system through a simple, and structurally minimal, mechanical linkage of the plurality of modules in an array using a single and relatively small motor to rotate the flexible transmission shaft. The flexible transmission shaft of the invention can be applied to all of the above-mentioned solar tracking geometries, and results in an optimized solar tracking system and method that is easy to install and maintain.

One aspect of the present invention is a mechanical drive mechanism that uses a rotating flexible transmission shaft, driven by a single motor, and connected to one or more worm gear drives that, in turn, may rotate torsion tubes having the plurality of modules mounted thereon. When a flexible transmission shaft is used instead of a rigid transmission shaft with articulated joints, fewer mechanical components are used. This increases the reliability on the solar tracking system and reduces operation and maintenance cost, respectively. In some embodiments, the plurality of modules may be configured in rows to represent an array for the solar tracking system. The rows of modules are generally horizontally positioned, or disposed, across the torsion tube, at the same tilt angle, where the long axis of the torsion tubes is oriented in a north/south direction. Each row of modules includes supports (e.g., support columns) positioned along the torsion tubes of the module. A bearing may be affixed at each torsion tube support such that rotary motion of the torsion tube may be affected through a drive gear assembly affixed to the torsion tube and supports. In some embodiments, the flexible transmission shaft may be positioned at right angles to the torsion tubes and may be attached to each drive mechanism to enable rotary motion of the torsion tube by applying rotary motion to the flexible transmission shaft. In some embodiments, the plurality of modules may be driven from a back side of the solar tracking system to avoid wind forces the mechanical drive mechanism may experience and virtually eliminate the impact of such forces on the mechanical drive mechanism due to the inherent design of the solar tracking system. Also, moment forces, induced by the wind and applied to the array, may not be effectively transmitted to the flexible transmission shaft or the mechanical drive mechanism. The result is that the flexible transmission shaft and mechanical drive mechanism do not need to resist the wind forces imposed on the array, and therefore remain stable in their construction for an optimized rotation of the plurality of modules of the solar tracking system. The back driving arrangement may also enable the flexible transmission shaft to be minimally constructed to allow for greater flexibility in the design and layout of the array.

A further aspect of the present invention is the use of a flexible transmission shaft constructed from a flexible material to enable the rows of modules in the array to vary in height and/or to translate in the north/south direction. Also, the use of a flexible transmission shaft allows for the construction of the array on an undulating, uneven, or slanted, terrain. Thereby enabling the installation of an array that is capable of being tailored to irregular sites and site location boundaries.

A further aspect of the present invention may be that an elimination the need to use inflexible transmission shafts having a plurality of articulating joints at both ends of the transmission shaft to allow the plurality of modules within the array to vary in height and/or to translate in the north/south direction.

Another aspect of the present invention includes the capability of using the flexible transmission shaft with either a substantially horizontal single axis solar tracking system, a tilt and roll single axis solar tracking system, a fixed tilt azimuth solar tracking system, and/or a carousel type fixed azimuth solar tracking system.

In some embodiments, a horizontal single axis solar tracking systems may minimize the required structural components via a high-density ratio of installed modules to land area ratio and provide peak performance using a programmable backtracking scheme for customizable solar energy collection. In some embodiments, the solar tracking system may minimize the number and weight of structural components, reduce on-site construction labor and installation requirements, and/or provide a means for stowing the array of modules in the event of a hurricane, typhoon or any other destructive weather event. In certain embodiments, the plurality of modules cost may considerably decline, causing the solar tracking system to remain competitive as compared with fixed-mounted arrays due to an incorporation of a minimal amount of structural maternal. The flexible transmission shaft of the present may achieve flexibility in installation site preparation, reliability, durability, and improved system operation.

In some embodiments, a tilt and roll single axis solar tracking systems may use similar operation principles as the horizontal single axis solar tracking system. Variations for the worm gear drive can be effectively used to drive tilt this system in an array field using only one motor and tracker controller. The flexible transmission shaft of the present invention may also be incorporated with this system to achieve the same flexibility as that for substantially horizontal single axis solar tracking systems regarding installation site preparation, reliability, durability, and improved system operation.

In some embodiments, a fixed tilt azimuth solar tracking systems may be specially designed with a vertical axis bearing. In some embodiments, the fixed tilt azimuth solar tracking system may be designed to support the worm gear drive to be close to the base of the support in order to provide clearance for the rotary drive linkage system underneath the module array. In certain embodiments, a conventional bearing system, such as a worm gear drive, may be incorporated within the solar tracking system if it is properly designed to withstand the load forces applied near the base of the support for the array. The flexible transmission shaft of the present invention may achieve the same flexibility of the horizontal single axis solar tracking systems regarding installation site preparation, reliability, durability, and improved system operation.

In some embodiments, a carousel fixed tilt azimuth solar tracking system may include a tilted array that is rotated on a large area circular bearing to follow the sun. In some embodiments, the solar tracking system may be constructed in a low-profile design for rooftop applications. In certain embodiments, the flexible transmission shaft of the present invention may achieve the same flexibility of the horizontal single axis solar tracking systems regarding installation site preparation, reliability, durability, and improved system operation.

The present invention is intended to provide a cost effective, long life and low maintenance solution for implementing modules for solar energy applications, and address the general problem of design, installation, and mounting of the plurality of modules in an array in order to maximize the economic energy recovery or gain. In some embodiments, the solar tracking system may incorporate a worm gear mechanical drive mechanism and a flexible transmission shaft to operate each of the above-mentioned solar tracking system geometries. Since the presently claimed solar tracking system invention, using a flexible transmission shaft, may be incorporated in various solar tracking system geometries, it allows for consideration of the balance between module efficiency, as it relates to solar tracking geometries, land use, materials utilization, operation and maintenance costs, weather and climate, and installation cost.

In some embodiments, the mechanical drive system may allow the worm gear drive module, powered by the motor, to rotate the flexible transmission shaft. In some embodiments, the machinal drive system may be configured in at least two ways: 1) with the worm gear drive, and flexible transmission shaft, deployment on an even terrain, without the use of an articulating joint on the flexible transmission shaft for connecting it to the motor shaft; and 2) without the worm gear, and with flexible transmission shaft, deployment on an uneven terrain, where the flexible transmission shaft uses an articulating joint at one end of the flexible transmission shaft for connecting it to either the motor shaft. In certain embodiments, both configurations may be employed within the solar tracker system in a field consisting of an even and/or uneven, terrain or irregularly shaped field installation site.

In some embodiments, the solar tracking system provides an improvement any prior art system by eliminating a need for large separate foundation(s) to mount the mechanical drive system. Also, the mechanical drive system (i.e., worm gear drives) may require less material than the prior art systems and allows for much greater flexibility in field layout of the plurality of modules while utilizing a single motor to drive a large array.

Other objects, aspects, advantages and novel features, and further scope of applicability of the presently claimed invention will be set forth in part in the detailed description to follow, taken in conjunction with the accompanying drawings, and in part will become apparent to those skilled in the art upon examination of the following, or may be learned by practice of the claimed invention. The objects and advantages of the claimed invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the presently claimed invention and, together with the description, explain the principles of the claimed invention. The drawings are only for the purpose of illustrating preferred embodiments of the claimed invention. A better understanding of the present invention can be obtained when the following detailed description of the enclosed embodiments is considered in conjunction with the following drawings, in which:

Figure 1:
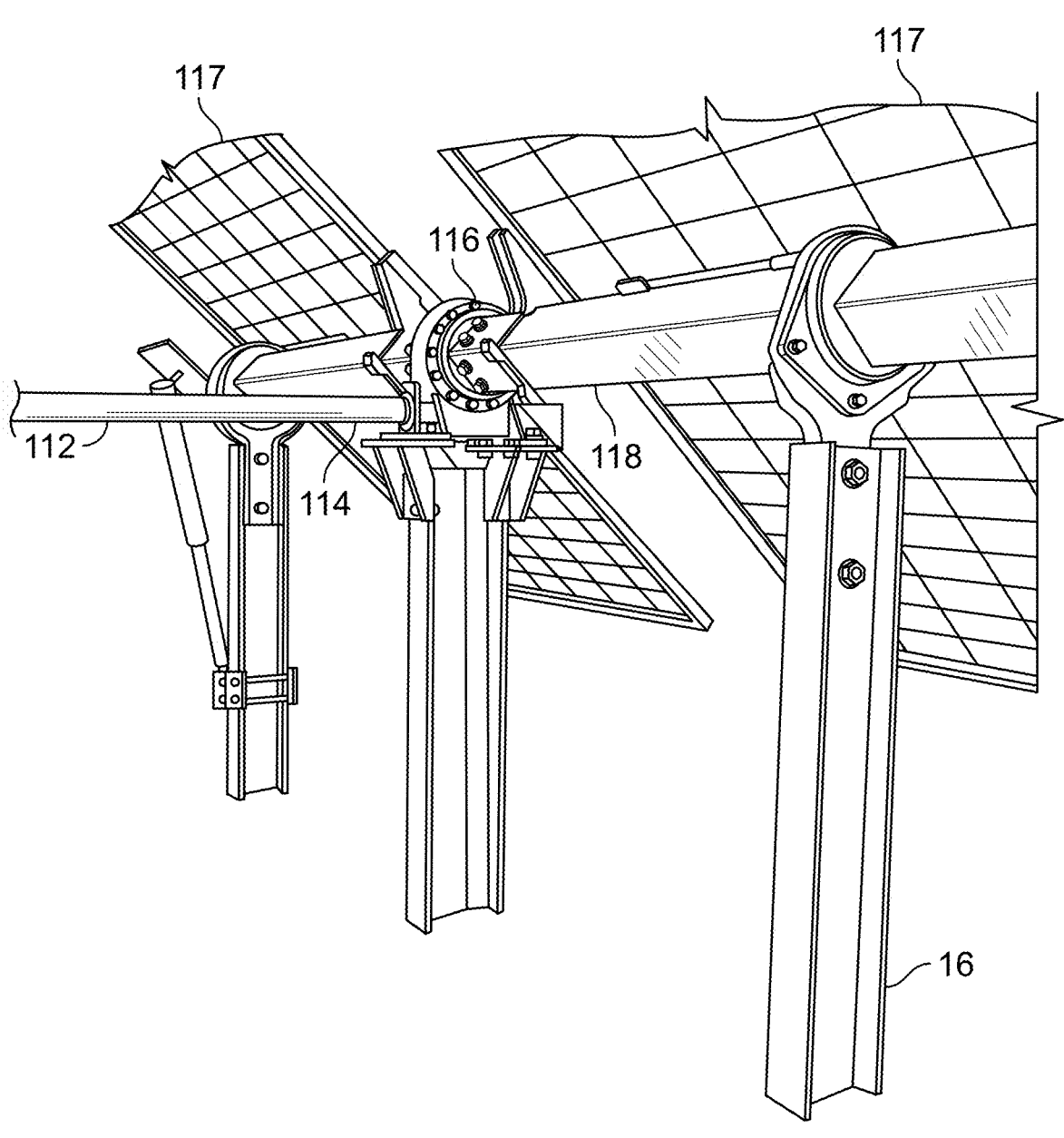
FIG. 1 depicts a perspective view of a flexible transmission shaft, in accordance with one or more embodiments of the present disclosure.

While certain aspects will be described in connection with the preferred illustrations shown herein, it will be understood that it is not to limit the invention to those aspects. On the contrary, it is intended to cover all aspects, alternatives, modifications, and equivalents, as may be included within the spirit and scope of the invention as defined by claims. In the drawing figures, which are not to scale, reference numerals are used throughout the description and in the drawing figures for components and elements.

DETAILED DESCRIPTION OF THE INVENTION

Turning now to the detailed description of the preferred arrangement (or arrangements) of various aspects of the present invention, it should be understood that, although an illustrative implementation of one or more aspects are provided below, the inventive features and concepts may be manifested in other arrangements and that the scope of the invention is not limited to the aspects described or illustrated. The various specific aspects may be implemented using any number of techniques known by persons of ordinary skill in the art. The disclosure should in no way be limited to the illustration, drawings, and/or techniques illustrated below, including the exemplary designs and implementations illustrated and described herein. The scope of the invention is intended only to be limited by the scope of the claims that follow. Furthermore, the disclosure may be modified within the scope of the appended claims along with their full scope of equivalents.

While the making and using of various aspects of the present disclosure are discussed in detail below, it should be appreciated that the present disclosure provides many applicable inventive concepts that can be embodied in a wide variety of specific contexts. The specific aspects discussed herein are merely illustrative of specific ways to make and use the disclosure and do not limit the scope of the disclosure.

The present disclosure will now be described more fully hereinafter with reference to the accompanying figures and drawings, which form a part hereof, and which show, by way of illustration, specific aspects. Subject matter may, however, be in a variety of different forms and, therefore, covered or claimed subject matter is intended to be construed as not being limited to any examples set forth herein, which are provided merely to be illustrative. Likewise, a reasonably broad scope for claimed or covered subject matter is intended. Among other things, for example, subject matter may be methods, devices, components, or systems. The following detailed description is, therefore, not intended to be taken in a limiting sense.

Throughout the specification and claims, terms may have nuanced meanings suggested or implied in context beyond an explicitly stated meaning. Likewise, the phrase "aspect" as used herein does not necessarily refer to the same aspect and the phrase "in another aspect" as used herein does not necessarily refer to a different aspect. It is intended, for example, that claimed subject matter include combinations of aspects in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The presently claimed invention can be used in any of the above-mentioned four solar tracking system geometries (e.g., a horizontal axis solar tracking system, a fixed tilt azimuth solar tracking system, a tilt and roll solar tracking system, and/or a carousel solar tracking system) with the commonality of being mechanically operated by a worm gear drive and a rotary flexible transmission shaft system. Each solar tracking system geometry may incorporate a primary driver, attached to a worm gear drive for rotating a flexible transmission shaft having column supports that provide support to an exemplary solar tracking system. In some embodiments, the exemplary solar tracking system aspects may allow a plurality of rows of modules to be driven by a single motor through the mechanical drive mechanisms applied to an array.

Horizontal Single Axis Solar Tracking System

FIG. 1 depicts an array segment for a horizontal single axis solar tracking system 110 of the presently claimed invention. In some embodiments, a solar tracking system 50 may contain one or more rows of modules 117 pointing towards the sun and assembled along the torsion tubes 118. Common examples may include one or more torsion tubes 118 having 1 to 2 rows of vertically oriented modules (not shown), and 1 to 4 rows of horizontal oriented modules 117, where a 1 row and 2 row of horizontal single axis row of modules 117. In some embodiments, each of the modules of the plurality of modules 117 may be mounted on a torsion tube 118 that is connected to a worm gear drive mechanism 116, oriented along the longitudinal direction of rotation for the torsion tube 118, and situated between the plurality of modules 117. In some embodiments, the plurality of modules 117 may be mounted on the torsion tube 118 using mounting techniques, such as U bolts, clamps, and/or other well know module mounting techniques. In some embodiments, a flexible transmission shaft 112 (shown in FIG. 3), connected to the worm gear drive mechanism 116, may rotate to mechanically drive the worm gear mechanism 116 In some embodiments, the flexible transmission shaft 112 may include a telescopic connector at one end or at both ends. In some embodiments, the worm gear drive mechanism 116, in turn, may rotate the torsion tubes 118, having the plurality of modules 117 disposed thereon, to position the modules 117 to be perpendicular to the sun. In some embodiments, the power for rotating the flexible transmission shaft 112 may be provided by a drive motor (not shown). The drive motor has a brake (not shown) for limiting motor run on after de-energizing and resisting motor coast and back forces.

In some embodiments, the horizontal single axis solar tracking system 110 may rotate the torsion tubes 118, in the north/south direction. The torsion tubes 118 may be inserted into bearings, with bearing surfaces such as no maintenance polymer bushings. In certain embodiments, the torsion tubes 118 may be attached to ground supports 119 that are used to support the torsion tubes 118 and worm gear drive mechanism 116. In certain embodiments, an additional array segment for the horizontal single axis solar tracking system 110, similar to solar tracking system segment 50 can be connected to the flexible transmission shaft 112 on each end of the flexible transmission shaft 112, with a separate and similar assembly. This can be repeated for several array segments. Thus, one motor (not shown) can be used to drive a plurality of array segments for a horizontal single axis solar tracking system 110. This type of mechanically driven array segments in a field may reduce the system's complexity, operation and maintenance costs, while increasing the system's reliability.

Figure 4:
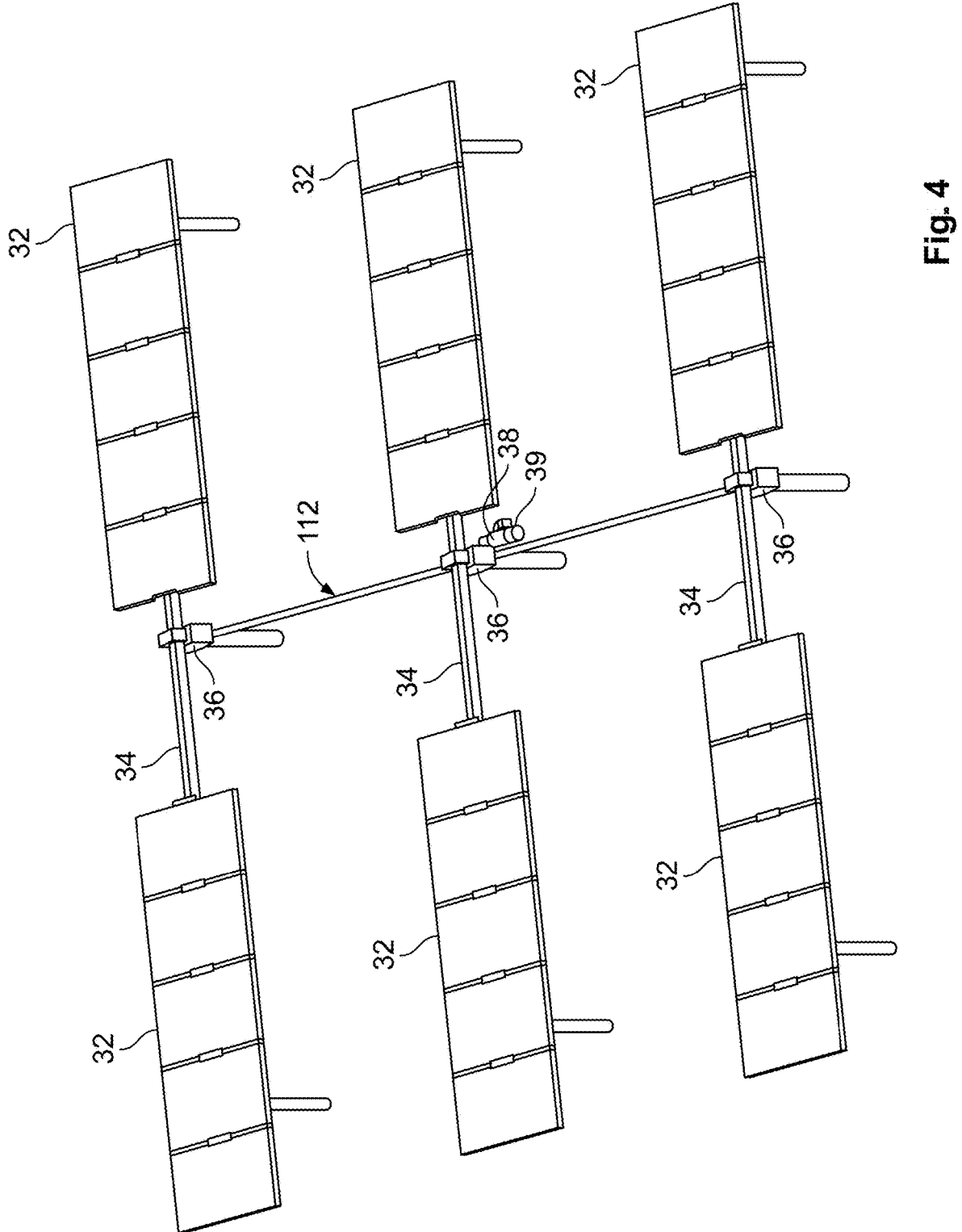
FIG. 4 depicts a horizontal single axis solar tracking system constructed of rows of modules positioned across torsion tubes, in accordance with one or more embodiments of the present disclosure.

FIG. 4 depicts an aspect of the present invention, where a single motor 38, attached to a ground support 36 in the center row of a solar tracking system array, is used to directly power the rotation of the flexible transmission shaft 112 for the mechanical drive mechanism 36 of the array to rotate the torsion tubes 34 and provide rotational movement to the plurality of modules 32.

Flexible Transmission Shaft

In some embodiments, the transmission shaft for the solar tracking system 50 of the present invention may refer to a rotating flexible transmission shaft 112. Such flexible transmission shafts may be represented by flexible tubes, bars, and/or rods. In some embodiments, the flexible transmission shaft 112 of the present invention may be rigidly connected to a motor at one end and connected to a worm gear drive mechanism 116 situated on a linear plane. In some embodiments, the flexible transmission shaft 112 may be configured to extend between, and connect to, the worm gear drive mechanism 116 used to rotate the torsion tubes 118. In some embodiments, the plurality of modules 117 may be mounted, or disposed, thereon to position the plurality of modules 117 so that they are substantially perpendicular to the sun and follow the path of the sun as it travels from east to west in the sky. Although the motor and worm gear drive mechanisms 116 are designed to be situated in a linear orientation, or on a ground surface that is substantially flat and offers an even plane, the terrain, or surface. In some embodiments, the plurality of modules 117 in the array may be undulating, slanted, or uneven, and prevent the plurality of modules 117, or the worm gear drive mechanism 116 that exists in a separate substantially parallel linear orientation to the substantially linear orientation of the worm gear drive mechanisms 116 to be coaxial or aligned. Any misalignment may produce tension forces, or moments, extending along the length of the flexible transmission shaft 112. In certain embodiments, the flexible transmission shaft 112 of the present invention may be flexible enough to absorb any tension forces that it experiences due to the row of modules 117, or worm gear drive mechanism 116, not being coaxial or aligned. The flexible transmission shaft 112 and its connections may be able to resist: the torque on the moving motor; external loads acting directly on the flexible transmission shaft 112 (e.g., wind introduced vibrations); applied weight during operation; and external load acting on the plurality of modules 117 and transferred through the worm gear drive mechanism 116 into the transmission shaft and motor. In certain embodiments, these loads are typically neglectable but may need to be considered depending on the worm screw geometry and the gear ratio of the worm gear drive mechanism 116. To achieve the required level of flexibility, the material used to construct the flexible transmission shaft 112, should preferably have a low Young Modulus, and at the very least a Young Modulus lower than steel. In some embodiments, the flexible transmission shaft 112 may be made from a combination of different materials along its length or even within its cross section. In certain embodiments, the Young Modulus may refer to a mechanical property of solid materials that measures the tensile or compressive stiffness when force is applied lengthwise. Materials having a Young Modulus lower than steel may include metals, such as aluminum; wood; fiber reinforced plastics (e.g., glass fiber reinforced plastic (GFRP), aramid fiber reinforced plastic (AFRP), and carbon fiber reinforced plastic (CFRP)); fiber glass; carbon fiber; and/or mixed fibers. In some embodiments, the cross-section size of the flexible transmission shaft 112 may be reduced from a transmission shaft, where the transmission shaft is fabricated from steel. For example, the cross-section size of the shaft for the flexible transmission shaft 112 may be preferably reduced from a D50 mm circular rod to a D25 mm circular rod. This reduction in the cross-section size of the shaft may offer additional flexibility to the flexible transmission shaft 112. Also, altering the material used to fabricate the transmission shaft from steel to a less heavy, and more torque resistant, material, may result in a reduction in the cross-section size of the flexible transmission shaft 112. By using a less heavy material the slag due to dead load is decreased without reducing the cross-section size of the flexible transmission shaft 112. In certain embodiments, the tube section can have a smaller slag due to dead load than a circular section, although the circular section has a smaller outer diameter.

Suitable flexible transmission shafts 112 for the present invention of different materials, may be manufactured to have the following specifications: an aluminum tube flexible transmission shaft 112, having a cross-section size of 50×2 mm; and a length of 5.5 m; along with a GFRP tube flexible transmission shaft 112, having a cross-section size of 74×7 mm, and a length of 6 m. Both flexible transmission shafts were tested and determined to capable of successfully connecting the worm gear drive mechanisms of the present invention, with a distance of 6000 mm between them, and capable of transferring a sufficient level of torque between the worm gear drive mechanisms in movement of the plurality of modules 117 for an array. In some embodiments, the flexibility of the flexible transmission shaft 112 may be capable of deforming elastically to compensate for tolerances in the misalignment of the worm gear drive mechanisms 116 and/or the plurality of modules 117. In some embodiments, the flexible transmission shaft 112 of the present invention can be fabricated using various fabrication techniques, such as aluminum extrusion or the like, pull-winding, wet or prepeg winding for fiber reinforced materials.

In some embodiments, the maximum tolerance between the connections for the worm gear drive mechanism 116 used to rotate the torsion tubes, and by connection the plurality of modules 117, may typically be even higher using a rigid shaft at both ends of the flexible transmission shaft 112. However, this shortcoming may be partially overcome by employing the flexible transmission shaft 112 of the present invention, constructed from a flexible material, or to have a smaller cross-section for the flexible transmission shaft 112 without articulated joints. Such construction allows for the transfer of an appropriate level of torque, while reducing the bending stiffness of the flexible transmission shaft 112 to a minimum. In certain embodiments, lowering the bending stiffness results in a higher maximum torque tolerance for the flexible transmission shaft 112.

In some embodiments, the connection between the flexible transmission shaft 112, motor shaft, and worm gear drive mechanism 116 may be a rigid, inflexible connection. This rigid, inflexible connection may be achieved using, for example, fasteners, such as spacers, pins, rivets, bolts, etc. While the rigid connection can also be made by using welds or glue, these types of rigid connections are typically not preferred as they are slow to install and more difficult to remove, e.g., in case of maintenance.

Figure 2:
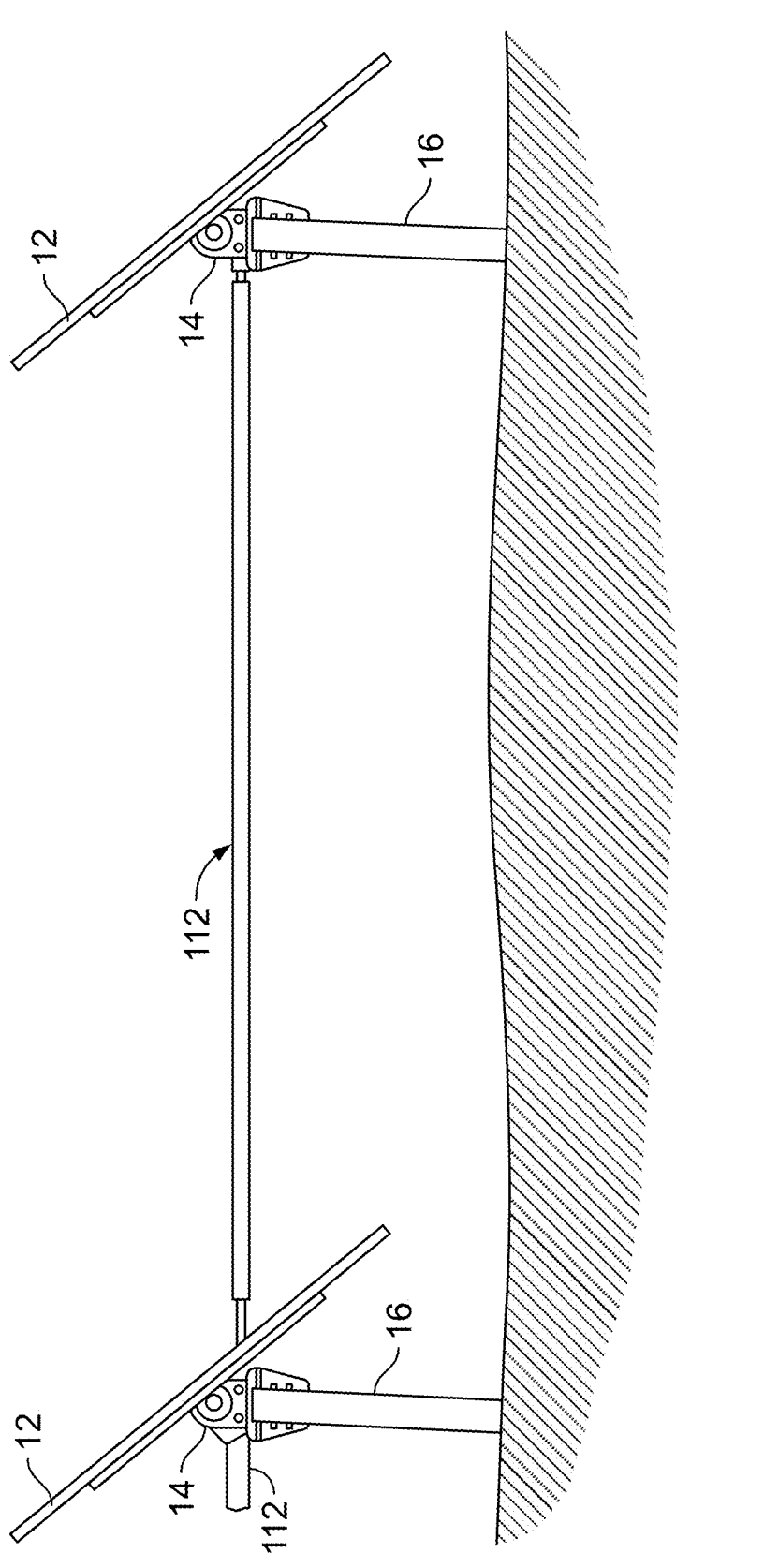
FIG. 2 depicts a side perspective view of a solar tracking system installed on an uneven terrain, in accordance with one or more embodiments of the present disclosure.

FIG. 2 depicts a solar tracking system 50 of the present invention installed at a location having an uneven terrain, where the location was not graded level to achieve the simplest (level terrain) installation. In some embodiments, the flexible transmission shaft 112 may connect one or more worm gear drives 14 that have been deployed on an ungraded, or undulating, terrain. In some embodiments, the flexible transmission shaft 112 may be connected to the worm gear drives 14 by a rigid joint at one end the flexible transmission shaft 112, and a rigid joint at the other end of the flexible transmission shaft 112. In certain embodiments, the flexibility of the flexible transmission shaft 112 may compensate for any non-linearity between the plurality of modules 12 in both the horizontal and vertical direction and allows the flexible transmission shaft 112 to connect to each worm gear drive 14 without precision leveling, and without there being a precise location of the next module 12 in relation to the first module 12.

Figure 3:
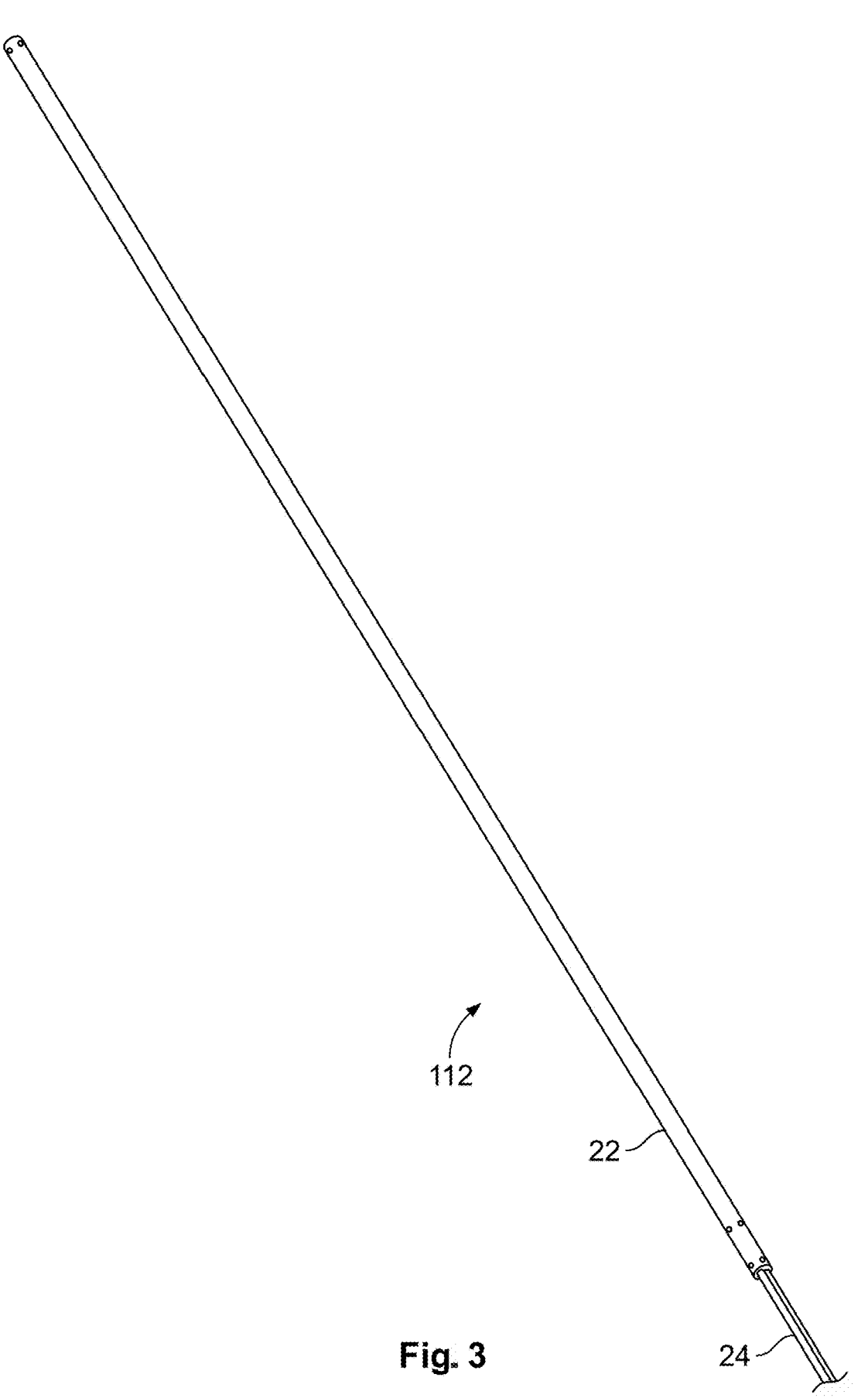
FIG. 3 depicts a top view of an isolated transmission shaft with a telescopic connection at a distal end, in accordance with one or more embodiments of the present disclosure.
Figure 8:
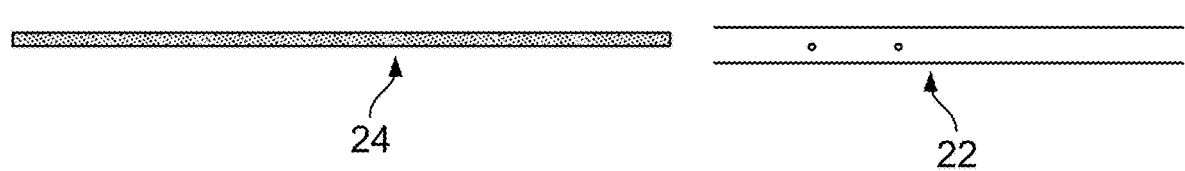
FIG. 8 depicts a perspective view of a transmission shaft within a horizontal single axis solar tracking system, in accordance with one or more embodiments of the present disclosure.

In addition to being flexible, the flexible transmission shaft 112 of the present invention optionally has a telescoping length tolerance mechanism as shown in FIG. 3 and FIG. 8. In some embodiments, the flexible transmission shaft 112 may be capable of telescopic length adjustment by using a flexible inner transmission shaft section 24 with teeth formed thereon, and a separate flexible outer transmission shaft section 22 with teeth formed therein and coaxially receiving the flexible inner transmission shaft section 24, in a concentric relationship to one another (see FIG. 8). In some embodiments, the teeth of the flexible inner transmission shaft section 24 may engage the teeth of the flexible outer transmission shaft section 22, such that the flexible transmission shaft 112 may be able to driveline rotate, transmit torque, stay in phase, and not pull apart when the flexible transmission shaft 112 is extended.

In some embodiments, the flexible inner transmission shaft section 24 may refer to a splined external surface including a plurality of teeth extending from its outer surface along a length thereof and forming a plurality of indentations. Each of the indentations is substantially rectangular shaped to correspond to the shape of the teeth of the flexible outer transmission shaft section 22. In certain embodiments, a pair of radially opposing ones of the indentations may include a protrusion formed therein extending along a length of the indentations. Additionally, a pair of radially opposing indentations having the same width of the other the indentations may accommodate the opposing teeth of the flexible outer transmission shaft section 22. In some embodiments, the flexible outer transmission shaft section 22 may refer to a splined inner surface including a plurality of teeth extending from its inner surface along a length of the flexible outer transmission shaft section 22. Each of the teeth are substantially rectangular shaped.

In some embodiments, the flexible inner transmission shaft section 24 may include a length of about thirty-eight inches. However, other lengths can be contemplated without departing from the scope or the present invention disclosure. In some embodiments, the flexible inner transmission shaft section 24 may include a substantially constant diameter from the first end to the second end thereof. In some embodiments, the flexible outer transmission shaft section 22 may receive an end portion of the flexible inner transmission shaft section 24, where the splined internal surface of flexible outer transmission shaft section 22 may interlace and engage with the splined external surface of the flexible inner transmission shaft section 24. In some embodiments, an interface between the flexible inner transmission shaft section 24 and flexible outer transmission shaft section 22 may refer to a length in range or about six inches to thirty-five inches. However, other lengths can be contemplated if desired.

In some embodiments, the flexible outer transmission shaft section 22 may refer to a length in a range of about ten to twenty-four feet depending on the distance between adjacent modules of the plurality of modules 117. However, other lengths can be contemplated without departing from the scope of the present invention. In some embodiments, the flexible inner transmission shaft section 24 typically has a substantially constant diameter from the first end to the second end thereof. The overall length of the flexible transmission shaft 112 of the present invention can be as much as 20 m.

The components of a flexible transmission shaft 112, enabling the telescopic length adjustment feature, are displayed in FIG. 2 and FIG. 8. In some embodiments, a flexible inner transmission shaft section 24 and a separate flexible outer transmission shaft section 22 may be flexible enough to deflect without inducing high bending loads on the flexible transmission shaft 112. In certain embodiments, the flexible outer transmission shaft section 22 may be made of materials that resist the high bending loads. Both, the flexible inner transmission shaft section 24, and flexible outer transmission shaft section 22, may, for example, be in the shape of a round flexible tube, or a square flexible tube. In some embodiments, the two transmission shafts 22 and 24 may be oriented such that the flexible inner transmission shaft section 24 may be concentric to, and slidably engaged, with the flexible outer transmission shaft section 22. Therefore, the flexible inner transmission shaft section 24, should generally have a smaller cross-sectional area than the flexible outer transmission shaft section 22 to allow the flexible transmission shaft to telescope, and suitably flex, such that the alignment of the flexible transmission shaft 112 may correct themselves through the flexing in the flexible inner transmission shaft section 24 and flexible outer transmission shaft section 22, enough to accommodate any misalignment (e.g., due to different elevations and/or angles of the plurality of modules 117 connected to the worm gear drive 116) via the torsion tube 118 by bending. In certain embodiments, the bending may occur towards the end of the transmission shaft 22. In some embodiments, the maximum amount of flexibility occurs at each end of the transmission shaft 22, while the center of the transmission shaft 24 may be less flexible. In some embodiments, the flexible transmission shaft 112 may bend as it connects with the worm gear drive 116 but is still capable of rotating to transfer a requisite amount of torque to the next worm gear drive mechanism 116.

In some embodiments, the angle of deviation sustainable for a flexible transmission shaft 112 having no degree of flexibility may refer to the lateral movement being quantitatively less than 0.5 percent (%) of the distance between any transmission shaft pivot points, considering the ends of the transmission shaft are parallel; at a low degree of flexibility the lateral movement is quantitatively less than 3%; and at a high degree of flexibility the lateral movement is quantitatively higher than 3%. In some embodiments, the telescoping flexible transmission shaft 112 of the present invention is flexible enough to be used with any of the solar tracking system geometries disclosed herein.

Transmission Shaft Flexibility

In some embodiments, the bending moment (M) may represent the forces imposed on the flexible transmission shaft 112 and is defined as a limiting load. In some embodiments, the imposed bending moment ("M") for the flexible transmission shaft 112 of the present invention, may refer to a rigid connection at both ends of the transmission shaft, is quantitatively determined, and represented, by the equation $M=6\times E\times I/L^2\times w$, where "E" is the Young Modulus; "I" is the transmission shaft section inertia; "L" is transmission shaft length; and "w" is the distance between the two parallel worm gear drives (pivotal points). In certain embodiments, the "I" (section inertia) mainly depends on the transmission shaft section height and the lower the "E" (Young's Modulus) and "I" (section inertia), the higher "w" (the distance between worm gear drives) can be for the same "M" (bending moment). In some embodiments, the bending moment ("M") is zero at the center of the shaft. In some embodiments, the normal force where a telescopic connection is employed is zero due to the friction-free telescopic connector. In some embodiments, the shear force ("V") that the flexible transmission shaft 112 experiences may be determined, and represented, by the equation $V=12\times E\times I/L^3$, where "E" is the Young Modulus; "I" is the transmission shaft section inertia; and "L" is transmission shaft length. In some embodiments, the shear force is constant along the length of the transmission haft. As for the shear forces "V" experienced by the flexible transmission shaft 112 of the present invention, the "M" (bending moment) equals 50 percent and "V" (shear force) equals 25 percent, and where there is an articulated joint present on the flexible transmission shaft 112, the bending moment "M" equals zero. In some embodiments, the bending stiffness for the flexible transmission shaft 112 is quantitatively determined, and represented by the equation $E\times I$, where "E" is the Young Modulus; "I" is the transmission shaft section inertia. In some embodiments, the $E\times I$ criterion may define flexibility using a more visible and practical parameter, which is the vertical or horizontal offset from a coaxial worm screw position of the worm gear mechanical drive mechanism with reference to the distance of the connection, or pivotal points W/L in unit %. When the mechanical drive mechanisms are moved away from the coaxial position, but the worm screws axis is kept parallel, the offset is divided by the distance. Employing this bending stiffness criterion to a rigid, or inflexible, equates to a transmission shaft bending stiffness of <0.5%, a low flexibility transmission shaft 112 has a bending stiffness of <3%, and a high flexibility transmission shaft 112 has a bending stiffness of >3%.

In some embodiments, the plurality of modules 117 may be misaligned in North-South direction. However, the worm screws, in the worm gear drive mechanism 116, of the mechanical drive mechanism may be parallel and perpendicular to the plurality of modules 117 for the solar tracking system's 50 rotation axis. In the case of a flexible transmission shaft 112, the worm gear drive mechanism 116 may stay in the same position and the flexible transmission shaft 112 connects in the direction of the worm screw. In between the plurality of modules 117, the flexible transmission shaft 112 may be connected to a worm gear drive mechanism 116 and may bend to connect to the next worm gear drive mechanism 116. When the motor rotates, the flexible transmission shaft 112 may rotate around its center point in each section along its length. In certain embodiments, the overall S shaped geometry may not be substantially affected by the rotation. At the ends of the flexible transmission shafts 112, the shafts may neither bend nor rotate when one of the ends is moved laterally. To allow this movement, the shaft needs to bend. The more flexible the transmission shaft 112 is, the lower the bending moment that is generated, the lower the risk of damage the transmission shaft. In other words, the higher flexibility of the transmission shaft, the more misalignment is possible given that the transmission shafts have the same resistance to bending.

Spacer

Figure 12:
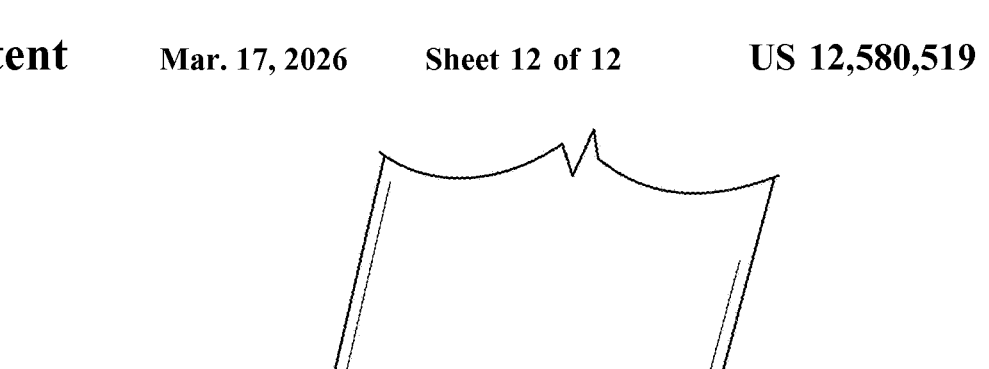
FIG. 12 depicts a detailed perspective view of a slotted connection as a part of the telescopic connection, in accordance with one or more embodiments of the present disclosure.

FIG. 12 depicts a spacer 130 for attaching to the flexible transmission shaft 112. In some embodiments, the spacer 130 can be in the middle of, or at an end of, a flexible transmission shaft 112 for connecting the flexible transmission shaft 112 to, for example, a motor drive shaft, or another section of the flexible transmission shaft 112. In some embodiments, the spacer 130 may be rigid and includes an elongated slot through holes to accommodate a connector piece 136 by using a fastener, bolt, mounting bracket, or some other type of connector piece. In some embodiments, the spacer 130 may allow for axial displacement (for assembly tolerances and thermal displacements) in the flexible transmission shaft 112. In some embodiments, once the connector piece 136 has been extended through the elongated through holes, the spacer 130 may refer to a set-in place and enables connecting the flexible transmission shaft 112 to another section of flexible transmission shaft 112 or the drive shaft of a motor.

Worm Gear Drive

A worm gear drive has two perpendicular axes, of which one is a worm screw that connects to the motor and transmission shaft, while the other axis connects to the torsion tubes. In the present invention, the worm gear drive must also resist higher loads due to their attachment to a torsion tube. The attachment changes angle as a cosine function while the torsion tube rotates. This results in the worm gear drive having to resist higher loads than a circular gear, or chain drive, that is used in other solar tracking systems, such the circular gear and chain drive used in U.S.

Figure 9:
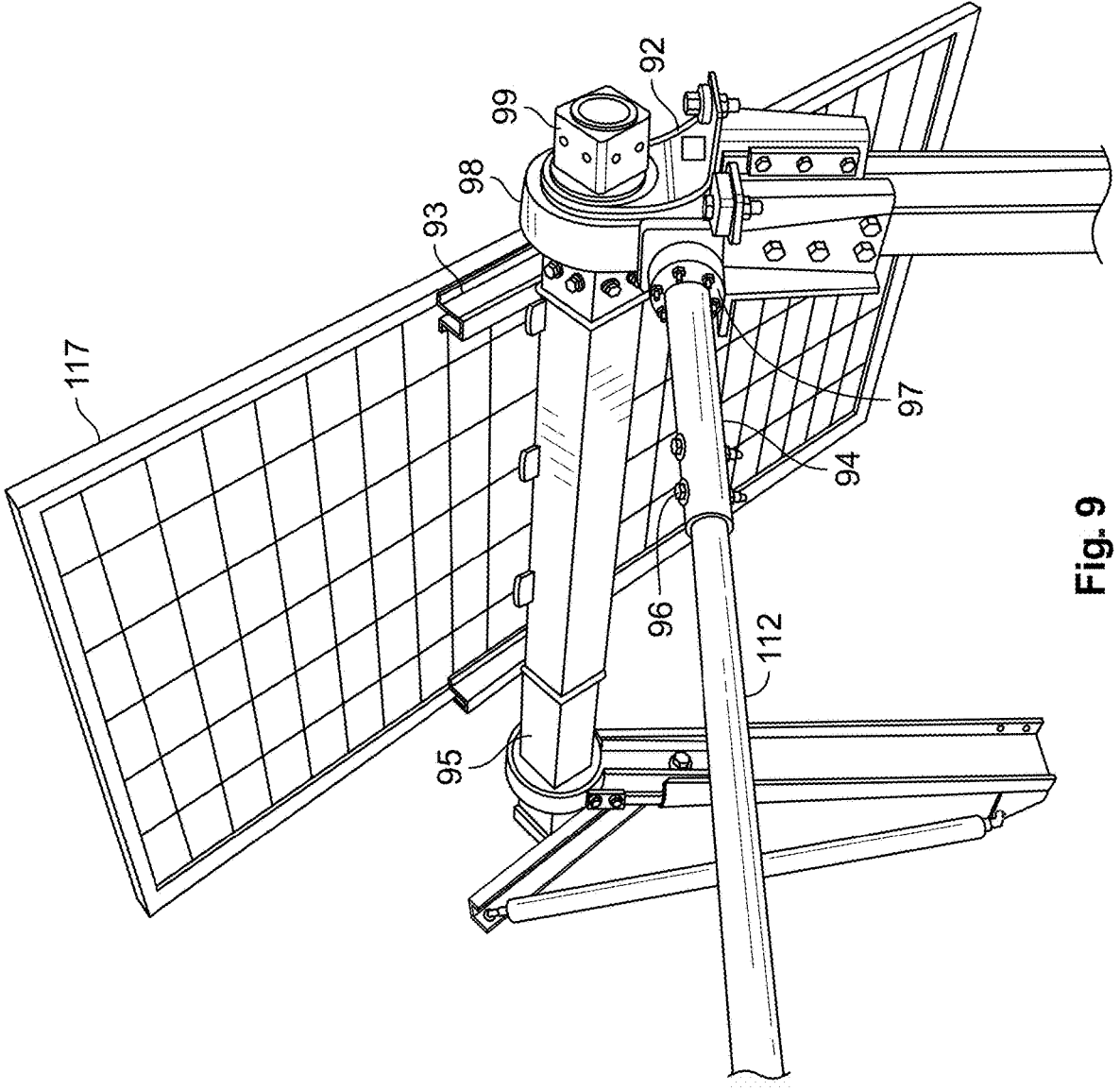
FIG. 9 depicts a perspective view of a horizontal single axis solar tracking system having two modules positioned across a torsion tube via a rigid flange connection, in accordance with one or more embodiments of the present disclosure.
Figure 10:
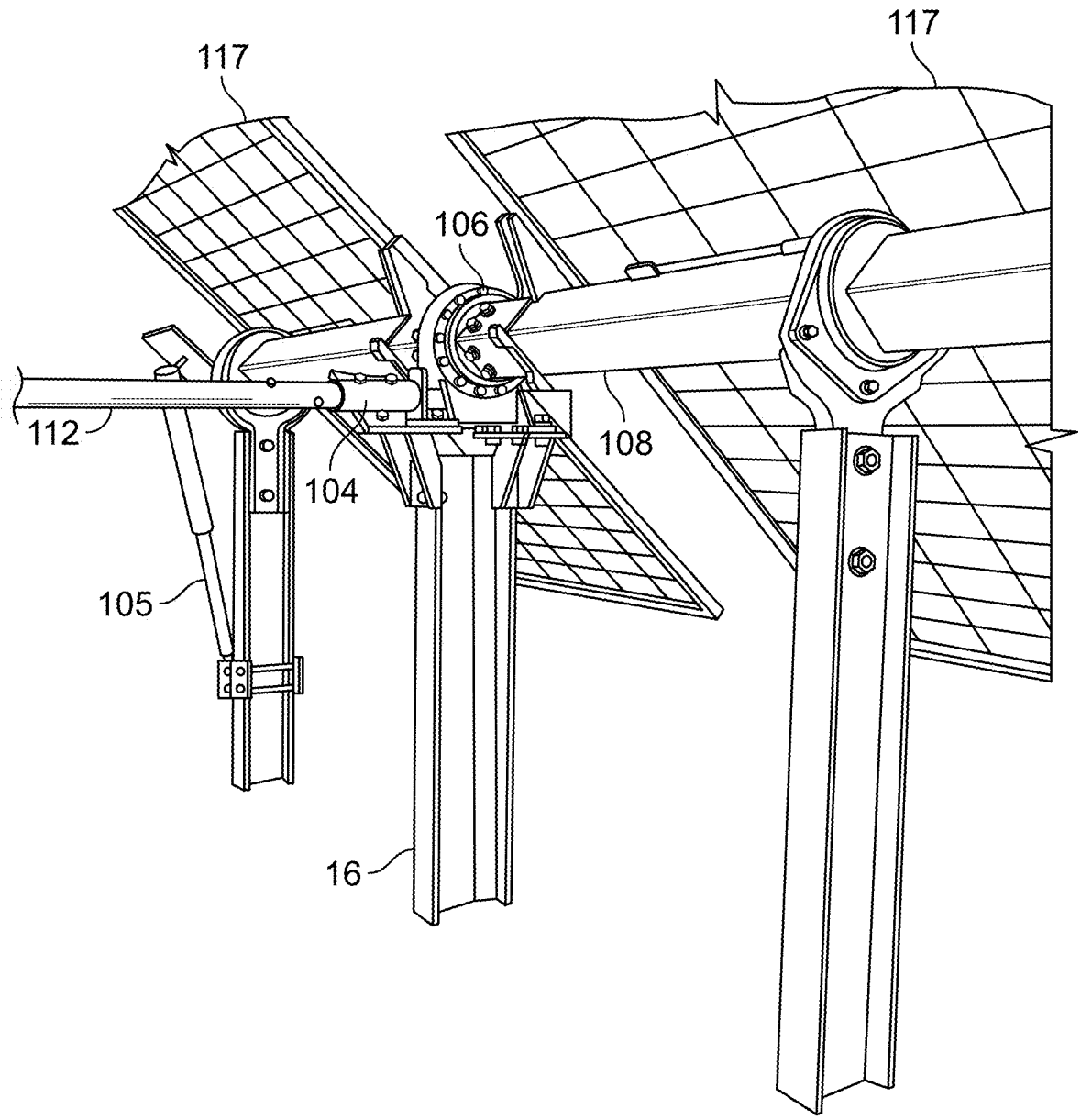
FIG. 10 depicts a perspective view of a horizontal single axis solar tracking system having two modules positioned across a torsion tube via a rigid connection, in accordance with one or more embodiments of the present disclosure.
Figure 11:
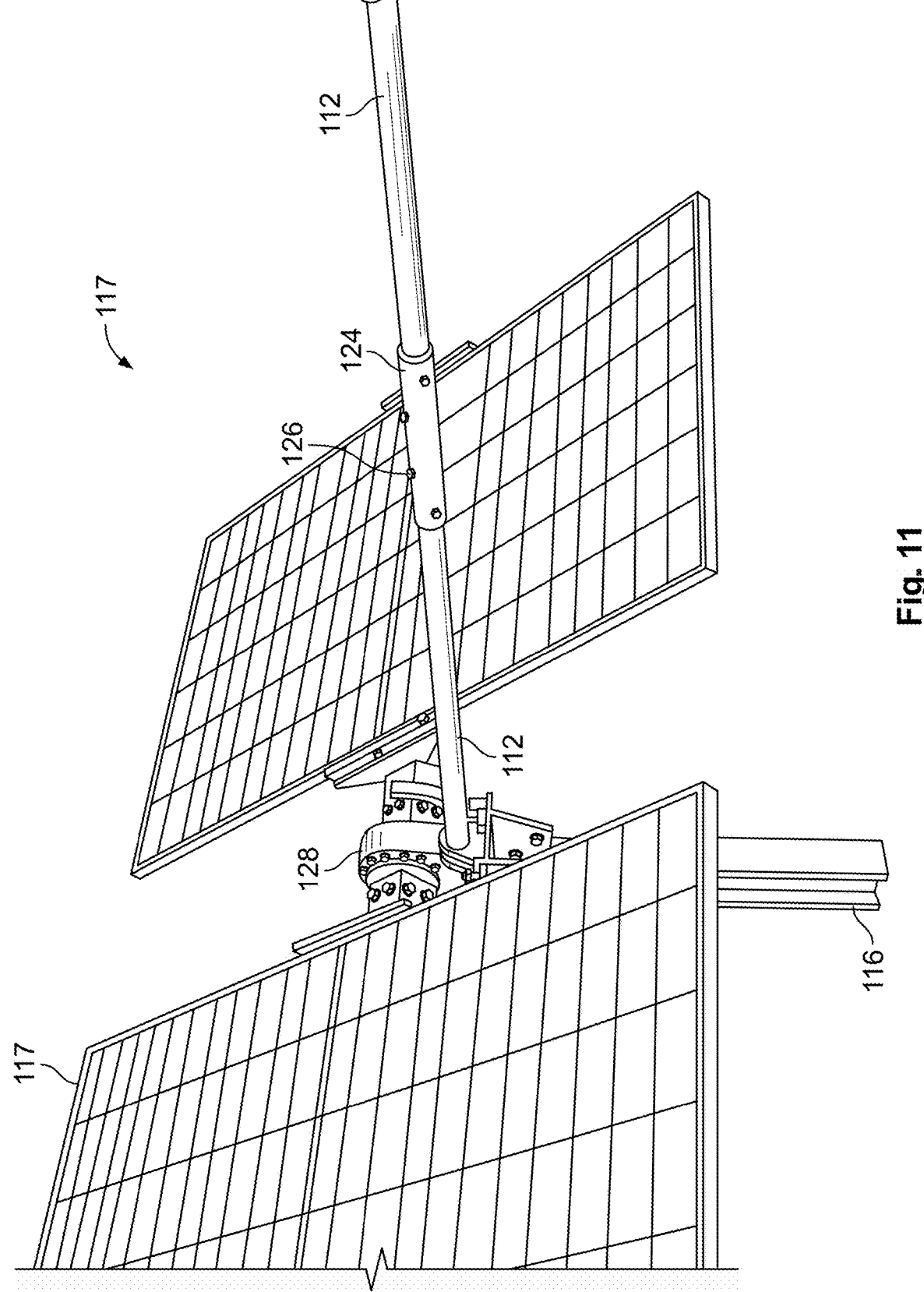
FIG. 11 depicts a perspective view of two modules within a horizontal single axis solar tracking system positioned across torsion tubes, in accordance with one or more embodiments of the present disclosure.

Pat. No. 8,459,249 to Corio. FIG. 1, FIG. 9, and FIG. 10, depict the worm gear drive mechanism used in the present invention, connected to the torsion tube 99 (FIG. 9), 108 (FIG. 10), and 118 (FIG. 1), and located preferably in the center of the plurality of modules 117. In some embodiments, the worm gear drive mechanism 98 (FIG. 9), 106 (FIG. 10), and 116 (FIG. 1), should be of minimum dimensions and allow for a constant leverage point to resist wind-load forces applied to the array. In some embodiments, the worm gear drive mechanism for each module of the plurality of modules 117 may be connected to the next worm gear drive mechanism by way of the rotating flexible transmission shaft 112 of the present invention. In certain embodiments, the worm gear drive mechanism 116 may eliminate the transfer of wind-load forces acting on the torsion tube 118, flexible transmission shaft 112, and motor, by absorbing the torque generated by the wind forces. The mechanical drive mechanism 116 resists the wind forces locally, within the array, at each row of modules 117, without transferring such forces to the flexible transmission shaft 112 extending between the worm gear drive mechanisms, or motor. In some embodiments, the worm gear drive mechanism 116 must resist both: loads from the torque tube and motion and/or torque from the motor. In certain embodiments, the worm gear drive mechanism 116 may block particular loads from the torsion tube 118 and preventing those loads from entering the transmission shaft 112. As a result, the only forces experienced by the worm gear drive mechanism 116 may be the forces generated by the rotational movement of the flexible transmission shaft 112 as it is driven by the motor 92 (FIG. 9). In certain embodiments, the main load on the mechanical drive mechanism may refer to the torque moment, which is limited by the holding torque the mechanical drive mechanism can nominally resist. The physical resistance may be higher (breaking torque). In some embodiments, the solar tracking system 50, with at least one row of vertical oriented modules, may include a torque moment due to wind load exceeding 15 kNm. Other forces like horizonal and vertical forces are in the range of approximately 10-20 kN but these forces can also be greater. In certain embodiments and when at least two rows of vertically oriented modules 117, the range of the horizonal and vertical forces may greatly exceed 20 kN.

In some embodiments, the solar tracking system 50 may incorporate a rotating flexible telescoping transmission shaft 112 and worm gear drive mechanism 116 to rotate a row of modules 117 with one motor. A mechanical drive e.g., worm gear drive mechanism 116, having a gear ratio of 1:361, can cause a row of 20 modules 117 to rotate and be aligned within 1 degree. Even under moderate wind conditions, a particular gear ratio associated with the solar tracking system 50, and friction in the worm gear drive mechanism 116, may provide relief from the torque requirements on the flexible inner transmission shaft section 24, and flexible outer transmission shaft section 22, of the flexible transmission shaft 112, and motor, thereby resulting in a smaller twist, or load, over the length of the row of modules 117, even at the limit torque capacity. While the flexible transmission shaft 112 under load may otherwise twist over the length of multiple modules 117, the twist reflected on the modules 117 is further reduced using the particular range of gear ratio for the worm gear drive mechanisms to allow the modules 117 to rotate using either rigid or flexible shafts. The result is a much stiffer row of modules 117, and a smaller discrepancy of the tilt angle between modules 117. The amount of external load on the modules 117 that reach the flexible transmission shaft 112 and motor depends on the worm gear drive design, its worm screw geometry, and gear ratio.

In some embodiments, the solar tracking system 50 may use one or more worm gear drive mechanisms 116 having a gear wheel and worm screw. The worm gear drive mechanism 116 may include an approximately 1:50 gear ratio. With this gear ratio, the external load may be reduced to 1/50 or 2% of its initial value when it reaches the worm screw of the worm gear drive mechanism 116. In some embodiments, the connecting surfaces between gear wheel and worm screw may be slightly inclined and parallel in the worm gear drive. For example, a lot of friction may be generated when the worm gear drives move, which is enough friction to withstand the 2% of the external load reaching the worm gear drive. When this is the case, the worm screw does not rotate, and no external torque is introduced to the flexible transmission shaft. However, for smaller gear ratios, such as 1:5, and a more inclined worm screw thread, the friction may not be enough to stop the rotation and load maybe transferred to the flexible transmission shaft. A gear ratio of 1:360 means that where there is rotation of the worm screw 1 time (360 deg), the gear wheel and hence the plurality of modules 117, or row modules will rotate 1 degree. Each worm gear drive may be set at the same incline as the flexible transmission shaft 112. In certain embodiments, the inclined setting for the worm gear drive mechanism 116 may facilitate and alignment of each module within the plurality of modules 117 with the worm gear drive mechanism 116 and makes the construction of each module of the plurality of modules 117 easier by allowing for loose tolerances and no alignment procedure. The result is that consecutive modules 117 are not likely aligned with respect to a single common liner axis of rotation, but rather, the worm gear drive mechanism 116 for each respective module 117 may be aligned. Since the torque load carried by the flexible transmission shaft 112 is small compared to the torque capacity of the worm gear drive mechanisms, the flexible transmission shaft 112 may deflect and accommodate misalignment without generating large bending stresses, while still being able to carry the required torque.

In some embodiments, any angular offset produced by the elastic deformation of the flexible transmission shaft 112, extending between the worm gear drive mechanism 116 may be reduced in a follower sail axis by the same magnitude as the worm gear transmission ratio (i.e. if the gearbox transmission ratio is 50:1, the transmission axis between the worm gear drive mechanisms must elastically deform 50 degrees for a phase difference of one degree in the axis of the follower sail. Taking this factor into account, the flexible transmission shaft 112 may include a round, or rotating square section shaft, capable of transmitting the torsion generated by the motor on the flexible transmission shaft 112 extending between the worm gear drive mechanism 116. In certain embodiments, the flexible transmission shaft 112 may move vertically in the center while rotating in response to the slag being different for the load when it is acting along the edge direction and/or a diagonal direction. To correct other factors, one skilled in the art would consider the deflection produced by the flexible transmission shaft's 112 own weight, which basically depends on the diameter, material, and thickness (cross-section size), of the flexible transmission shaft 112.

Motor

In some embodiments, the solar tracking system 50 of the present invention may include a motor 92 (see FIG. 9) rotatably connected to the flexible transmission shaft 112 imparting rotational motion to the worm gear drive mechanisms 98 (FIG. 9), 106 (FIG. 10), and 116 (FIG. 1) thereby causing the worm gear drive mechanisms to rotate, which thereby rotates the torsion tube 118. In some embodiments, the motor 92 may be any type or device, either automatic or manual, supplying rotational energy, such as: an electric, gas, solar or other type of energy powered motor, a manually operated crank, or any combination of these devices. For example, a 24 Volt DC geared motor having a max torque of 92 Newton meters, a rated torque of 46 Newton meters, and a rated speed of 10.3 rotations/minute may be used. However, a variety of other suitable motors can be employed. The motor may be preferably located at the end of the transmission shaft and at the worm gear drives.

In some embodiments, the coupling of the motor to the flexible transmission shaft 112 may be simplified since the transmitted torque is relatively small. The torque carried by the flexible transmission shaft 112 should never be higher than the torque provided by the motor.

Support Columns

In some embodiments, the support columns may be used to support the plurality of modules in an array. In some embodiments, the support columns for any subsequent modules in an array may be located to some elevation tolerance relative to the other rows of modules in the array. Therefore, field site preparation, such as grading, is imperative to avoid disconnections and breakages in the rows of modules making up the array. However, the use of the flexible transmission shaft 112 of the present invention greatly minimizes tolerance loads on the rows of modules, allowing the support column height from row to row to be vary. Referring again to FIG. 3, support columns 16 may be fabricated from round steel galvanized tubing. In certain embodiments, the support columns 16 may refer to I beams or C channels directly rammed into the ground; where the I beam may refer to a girder that has the shame of an I when viewed in section, and the C channel may refer to a beam that two parallel flanges connected by a web, forming a distinctive "C" shape. In a ground-based installation, multiple support columns 16 may be vertically attached to the earth in a straight line using a concrete foundation, where the support columns 16 may be driven into the ground, secured to a foundation or to some other foundation arrangement (not shown). For mounting to other structures such as a commercial rooftop or carport, the support columns 16 are attached to the structure or a support member associated with the structure (not shown). It may be desirable when mounting the support columns to another structure to use an A-Frame support design instead of a vertical support column in order to distribute the forces over a greater area across the host structure (not shown).

Torsion Tube

In some embodiments, the torsion tubes in the present invention may include the plurality of modules mounted across their surface. FIG. 1 depicts two torsion tubes 118, situated in the bearing housing of a worm gear drive 116, where the worm gear drive is connected to the flexible transmission shaft 112 via a rigid connection 114. FIG. 10 depicts two torsion tubes 108, situated in the bearing housing of a worm gear drive 106, where the worm gear drive 106 is connected to the flexible transmission shaft 112 via a rigid connection 104. FIG. 9 depicts a torsion tube 99, situated in the bearing housing of a worm gear drive 98, where the worm gear drive 98 is connected to the flexible transmission shaft 112 via a rigid flange connection 97. The torsion tubes of the present invention 118 (FIG. 1), 108 (FIG. 10), and 99 (FIG. 9), are typically made of a plurality of coaxial tubular, or square, portions that are adjacently connected to support columns 16 (FIG. 2) and are located on the back side of the modules 117. The torsion tubes are preferably made of a plurality of coaxial square portions are preferably situated in the bearing housing for the worm gear drive, where the bearing design is a polymer to center the square torsion tube into the round bearing housing of the worm gear drive mechanism atop the support columns 16 (FIG. 1). In certain embodiments, the polymer of the bearing design may refer to polyethene. In certain embodiments, the polymer of the bearing design may refer to a plurality of plastics. The torsion tubes may be comprised of several pieces joined together by a swaged connections where one tube is formed with a smaller section to fit into the next tube (not shown). The joints may be welded together to ensure a secure connection (not shown) and the welds should be cleaned and painted to avoid corrosion.

As depicted in FIG. 9, the plurality of modules 117 may connect to a torsion tube 95 with a mounting apparatus comprising a module frame clamp, a module laminate connection, or a module-mounting rail. In some embodiments, a connection to the torsion tube 95 may be made using a square bend U bolt 91, or two bolts and a plate, to form a clamp around torsion tube 95 connecting it to the module mounting rails 93. In some embodiments, this arrangement may form part of at least one module of the plurality of modules 117 that rotate east and west as the worm gear drive 98 rotates the torsion tube 95 to minimize an over-hung rotational moment that the overhung weight of the plurality of modules 117 may create. This may be accomplished by directly connecting the modules 117 to torsion tube 95, or if necessary, using a module rail 93 with a minimum depth, or offset, from the surface of torsion tube 95.

Bearing Assembly

In some embodiments, the torsion tubes 95 may be joined to the bearing assemblies of the worm gear drives, installed atop the support columns, at approximately ninety degrees (depending on the north/south slope of the ground) to the support columns forming a tee. The bearing assemblies are preferably polymer bearings. The vertical portion of the torsion tube may form a sleeve to mount over or inside of the support column. This sleeve may be secured to the support column with bolts that burrow into the column and may be further secured with a roll pin pressed into a hole in the two parts or may simply be welded to the column. Bearing assemblies may be fabricated with a plate, or plates, that bolt to a vertical support (not shown). Inside the horizontal tube housing for the bearing is an injection-molded polymer bearing, or the like, that has an inside shape conforming to torsion tube, and a round outside diameter. This bearing may be made from a polymer material such as UHMW polyethylene with UV inhibitors and may be filled with a lubricant. This bearing may be formed by two separate pieces to facilitate installation into the tee housing.

Dampers

As depicted in FIG. 10, dampers 105 may be connected to the support columns 16 to be installed along the length of torsion tube 108 to decouple the structure from wind-induced forces. In some embodiments, dampers 105 can reduce the torsion and/or translation vibrations of the solar tracking system that may be introduced by external loads such as wind. Different types of dampers 105 are known such as hydraulic damper, single mass damper, magnetic damper, etc.

In some embodiments, dampers 105 may increase the number of modules 117 that can be mounted onto a longer torsion tube 108 without increasing the stiffness and cost of the supporting structure. Using dampers 105 may eliminate the need to increase the size of the torsion tube 108, while allowing more modules 117 to be mounted onto the same cross-section size torsion tube 108. The result is that the center of gravity of the array remains close to bearings, which minimizes the overhung weight loading to the mechanical drive system and spreads the cost of the worm gear drive mechanism over a larger module 117 row size.

Tilted Single Axis Tracking System

Figure 6:
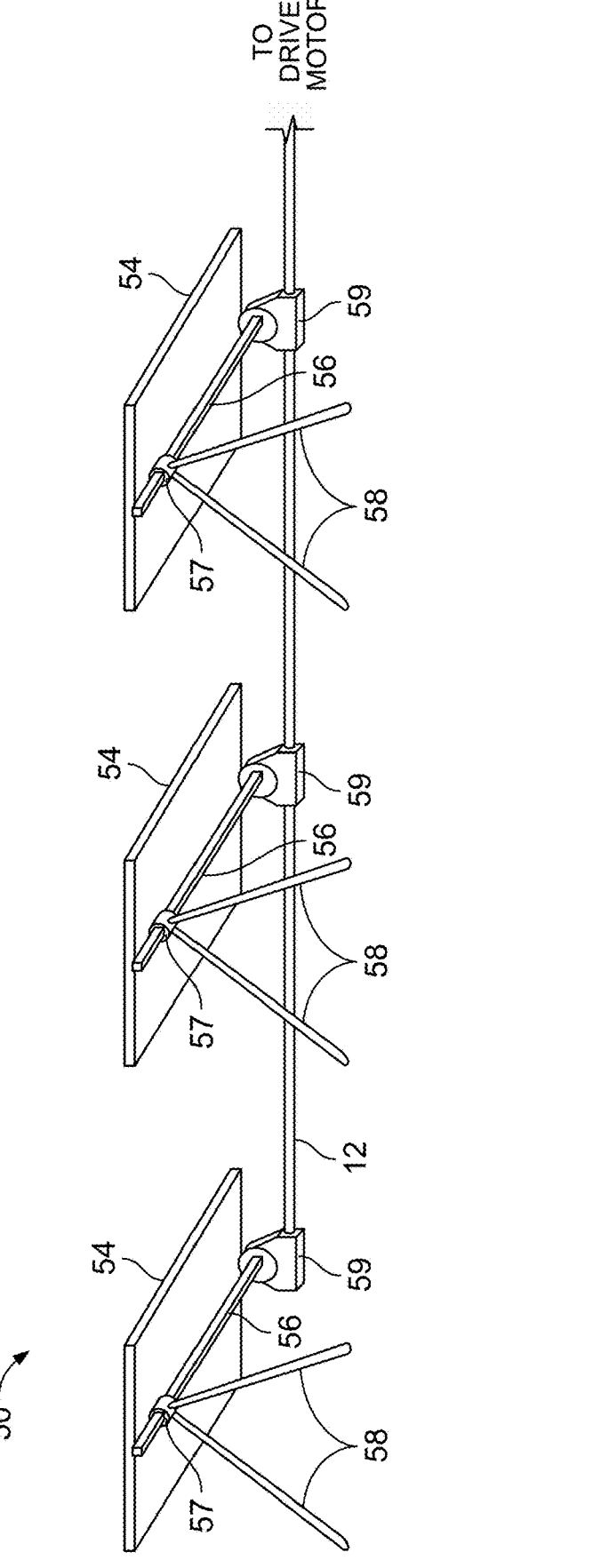
FIG. 6 depicts a fixed tilt carousel solar tracking system having rows of modules positioned on a frame, in accordance with one or more embodiments of the present disclosure.

FIG. 6 depicts the array segment for a tilt and roll, single axis, solar tracking system 50 embodiment of the present invention. In some embodiments, the solar tracking system segment 50 for pointing one or more modules 54 towards the sun. In some embodiments, a rive mechanism motor, as previously described, may provide the power to rotate the flexible transmission shaft 112, which drives worm gear drives 59 that move modules 54 via torsion tubes 56. In some embodiments, the worm gear drives 59 may utilize a rotating torsion tube 56. In certain embodiments, the rotating torsion tube 56 may be tilted, in the north/south direction, incorporating support columns 58 on which modules 54 are mounted. Torsion tubes 56 can be inserted into upper bearing 57, with bearing surfaces such as low maintenance polymer bushings, and attached to the support columns 58. A combination thrust and radial bearing can be incorporated into worm gear drives 59 to resist the downward and radial forces exerted on the array. As previously described, the worm gear drives 59, in turn, may rotate the torsion tubes 56 directly. When activated by the worm gear drives 59, the modules 54 are rotated via the torsion tubes 56. One motor can drive a plurality of worm gear drives 56. The tilt and roll tracking system 50 exploits the same "one way" worm gear drive 56 as the above-described horizontal tracking system embodiment and thereby transmits only the forces necessary to rotate the array and the wind forces are resisted locally within each solar tracking system array segment 50.

Fixed Tilt Azimuth Tracking System

Figure 5:
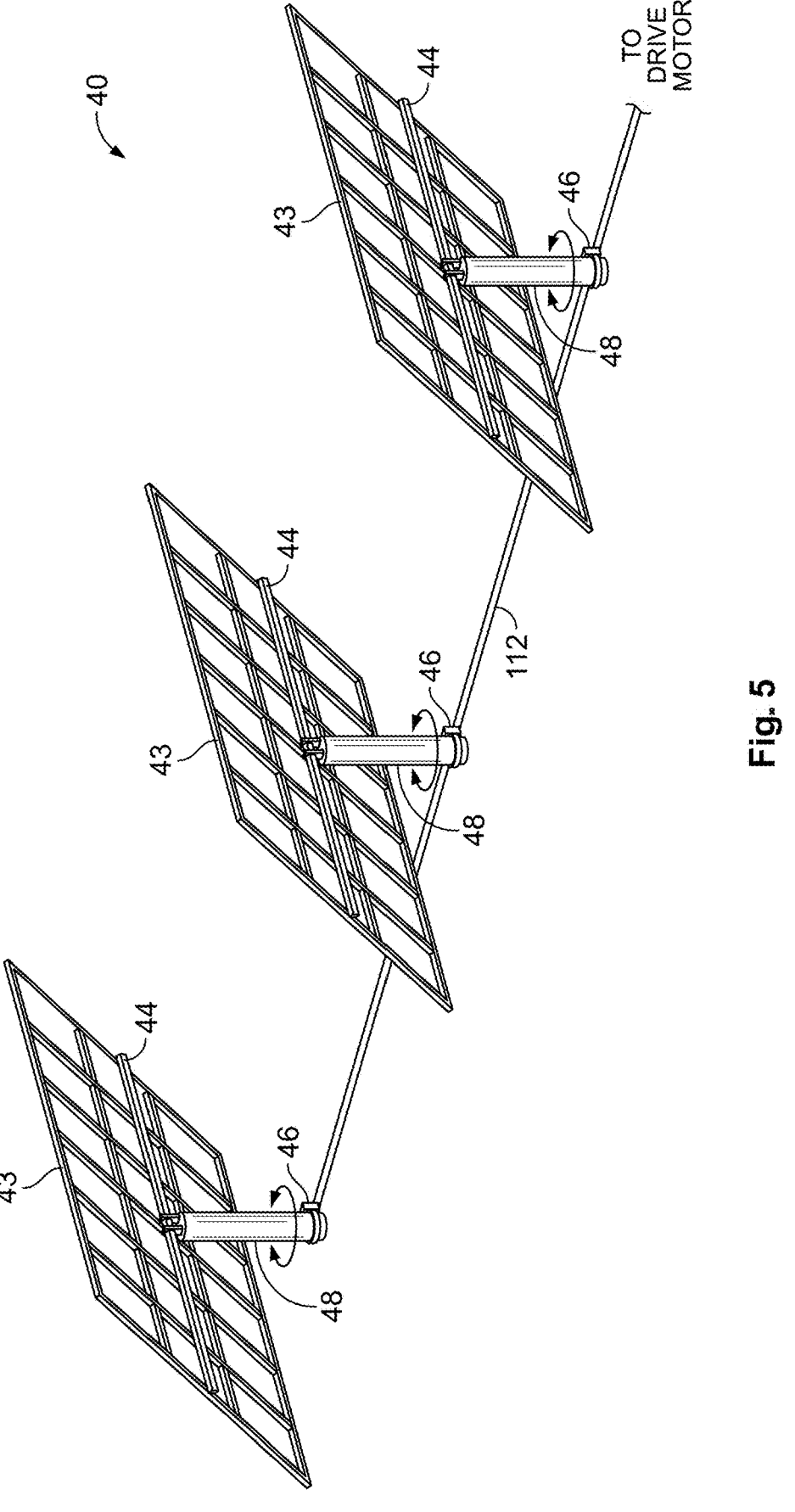
FIG. 5 depicts a tilt and roll solar tracking system constructed of rows of modules positioned across torsion tubes, in accordance with one or more embodiments of the present disclosure.

FIG. 5 depicts the array segment for a fixed tilt azimuth single axis solar tracking system 40 embodiment of the presently claimed invention. This embodiment may refer to a solar tracking system segment 40 for pointing one or more modules 43 towards the sun. The worm gear drive 46 was previously described and is similar to the description above for the tilt and roll, single axis, solar tracking system (see FIG. 6 description). The worm gear drive 46 may utilize a rotating support torsion tube 48, where the torsion tube 48 is vertical and incorporates a structure with mounting rails 44 on which modules 43 are mounted. As in the previous embodiments, a worm gear drive 46 may be driven by the flexible transmission shaft 112 that in turn rotates outer vertical tube along with mounted modules 43.

Another embodiment of the array segment for a fixed tilt azimuth single axis solar tracking system 40 may incorporate a worm gear drive 46 mechanical drive mechanism to rotate and support the array. In some embodiments, the drive bearing, and mechanical drive mechanism are located sufficiently low on the structure with mounting rails 44 so that the rotating linkage does not interfere with the modules 43 as they rotate. One motor can drive a plurality of drive mechanisms. In some embodiments, the fixed tilt azimuth tracking system 40 may exploit the same "one way" worm gear drive 46 as the above-described horizontal tracking system embodiment thereby resisting the wind forces locally within each solar tracking system array segment 40.

Carousel Azimuth Tracking System

Figure 7:
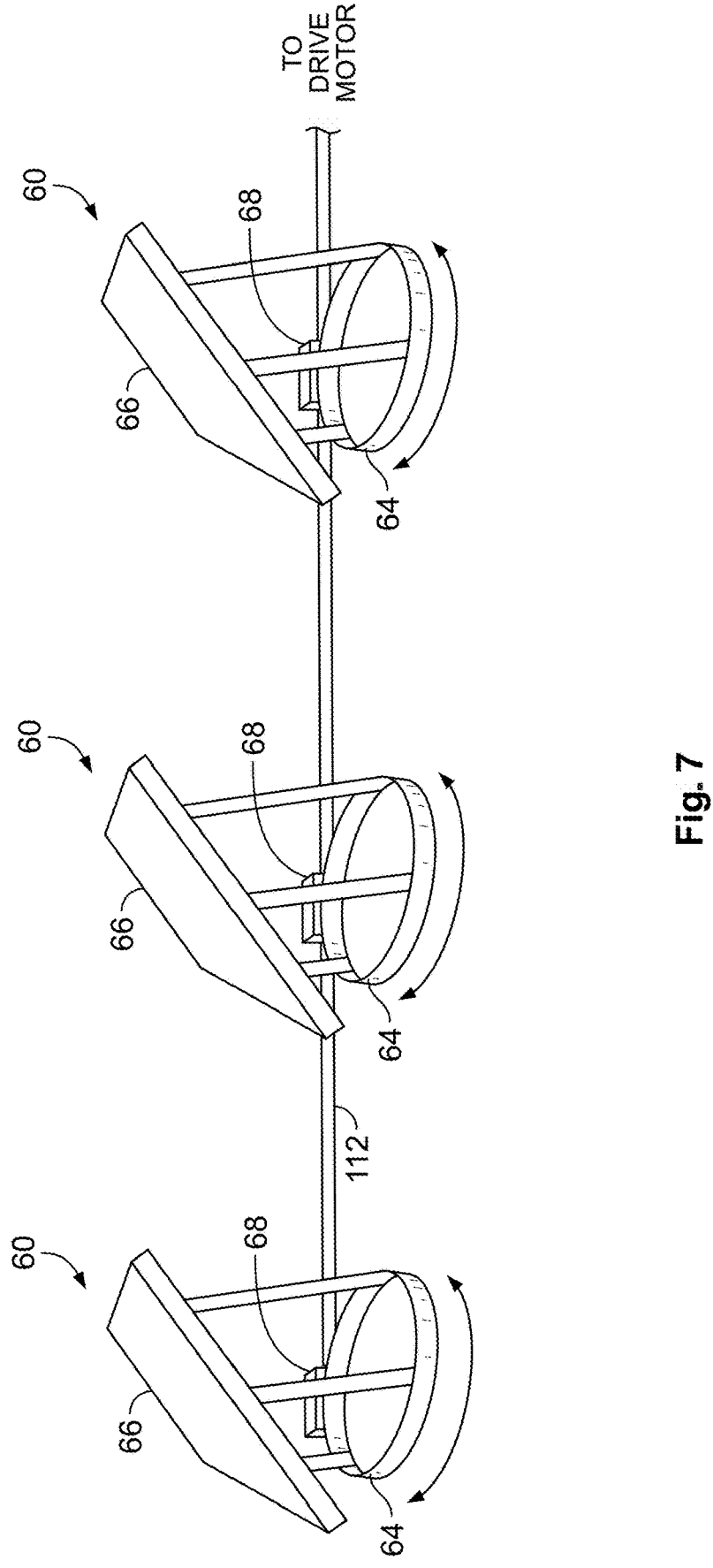
FIG. 7 depicts a side view of the inner-tube and outer-tube sections of a telescoping flexible transmission shaft, in accordance with one or more embodiments of the present disclosure.

FIG. 7 depicts the array segment for a carousel azimuth single axis solar tracking system for pointing one or more modules 60 towards the sun. In some embodiments, the worm gear drive 68 was previously described and is similar to the description above for the tilt and roll, single axis, solar tracking system (see the worm gear drive description in FIG. 6). The worm gear drive utilizes a rotating flexible transmission shaft 112 may provide the power and connection to move the carousel base 64 to rotate modules 66 for each carousel azimuth tracking system. Rotating flexible transmission 112 rotates the worm gear drive 68 which in turn rotates the carousel base for the solar tracking system for each segment of modules 60 which may also be configured in a low profile to minimize wind loads and resist them locally within each flexible transmission shaft 112.

Tracker Controller

The present invention also employs a microprocessor solar tracker control system, as part of the method for controlling the solar tracking system. The microprocessor solar tracker control system which may incorporate a global positioning system (GPS) to obtain location and time information to automatically update and compensate for the internal clock drift of the electronics. Time, date, and location information will be used by the microprocessor controller to calculate the solar position and move the solar tracking system to maximize the exposure of the modules to the sun. The tracker control system may also have external inputs such as a wind speed monitor, and tracker angle, to enable the trackers to be automatically feathered in the event of a severe windstorm. The control system may include a manual override function to manually manipulate the tracker position for installation or maintenance. This control system may also incorporate diagnostics, such as tracker functionality and/or array output monitoring.

The operation system of the tracker controller monitors the wind speed and snow height by sensors (anemometers, precipitation sensor, ground height sensor, etc.). When the sensors mark a critical level for its parameter, the operation system stops the tracking mode and moves the solar tracking system array into safety position (see the figure below). For example, if a gust wind speed of 50 km/h is exceeded, and noticed by one of the anemometers, the operation system sends a signal to the tracker controller to move and stop at a tilt angle of 45 degrees. If the tracking range is –60 degrees (east) to +60 degrees (west) from all the possible tilt angles, only one (e.g., 45 degrees) is used as safety position. The safety position can be different for different parts of the array. The sensors keep measuring. Once the signal is below a certain threshold, the operation system sends the tracker controller a signal for normal operation mode: tracking, backtracking etc.

The control system interacts with the motorized portion of the mechanical drive mechanism and the data collection system. The worm gear drive will incorporate a position feedback mechanism, preferably digital, to allow the microprocessor to move the tracker into a desired position and keep track of whether the tracking system is functioning properly. The motorized assembly incorporates an end of travel indicator that will allow the microprocessor to know that it is in the "end" position so that the motor will not drive the trackers past their mechanical limits and will allow the position of the tracker will reset itself once per day by the end of travel indicator such that there will be no accumulation of position error. The motor should incorporate a means of dynamic overload protection. If the tracking system fails to move due to mechanical failure or motor overload, the control system should be capable of detecting the malfunction, stop the operation, and record or transmit the information.

Many or the motorized tracker drives may be connected to a single controller in either a wired or wireless network configuration. Multiple master controllers in a large solar field configuration may be networked together. The tracker control system may record and communicate current tracker positions. It may also record and communicate faults in the tracker system to a supervisory control system. Other enhancements to the control system may include solar panel output monitoring on each tracker.

Since the entire module output falls to near zero if it is partially shaded, it is necessary to incorporate a backtracking scheme which will rotate the modules in the opposite direction of the sun in order to eliminate one module from shading another in the early morning and evening as the sun is close to the horizon. The backtracking scenario may be calculated from the sun angle, the height of the array and the spacing between modules. Individual modules may backtrack at different rates based upon the mounting height of the trackers in relation to the adjoining modules. For smaller installations where fewer modules are installed, a simpler optical, closed loop tracking system can be used instead of the open loop microprocessor control as described above.

In some embodiments, the solar tracking system 50 may utilize one or more processors to acquire topographical survey map to apply at least one directional tracker line. In some embodiments, the solar tracking system 50 may assess one or more changes in elevation along each directional tracker line. In response to assessing the one or more changes in elevation, the solar tracking system 50 may determine angle changes from a first support beam to a second support beam, where each support beam provides support to the plurality of modules when the solar tracking system 50 is on uneven ground. In some embodiments, the solar tracking system may identify one or more locations outside of tolerance of predicted stress for a torque tube. In some embodiments, the solar tracking system 50 may determine that an out of tolerance location can be addressed via a custom support beam. In some embodiments, the solar tracking system 50 may validating the custom support beam by comparing an earth grading of a particular location to a predetermined value. In some embodiments, the solar tracking system 50 may identify one or more locations within the survey map to place a subsequent solar tracker based on the validation of the custom support beam.

In some embodiments, the solar tracking system 50 may incorporate a spring counter-balance assembly connected to the torsion tube, where the spring counter-balance may refer to a bearing housing, a bushing disposed within the bearing housing, the bushing being confider to be slidably mounted onto the torsion tube, and one or more compressible cords made of a flexible material. In certain embodiments, the compressible cords may be located between the bushing and the bearing housing. In certain embodiments, the compressible cords may provide damping during rotational movement of the solar tracking system 50.

As part of the microprocessor solar tracker software for the control system, artificial intelligence (A/I) software can be employed to control the system and, for example, can be used to control the external inputs, manual overrides, diagnostics, safety position, or stowing, worm gear drive position feedback, end of travel, dynamic overload, and back tracking.

Although this description referred to modules, the presently claimed invention can also be used to track solar heat collectors, building shade systems, sunlight exposure testing of materials, and other systems that require tracking of the sun.

Although the claimed invention has been described in detail with particular reference to preferred embodiments, other embodiments can achieve the same results. Those skilled in the art will recognize that changes, revisions and various modifications may be made in form, construction, and detail, to the extent foreseeable, without departing from the spirit and scope of the invention. The presently claimed invention is intended to cover in the appended claims all such modifications and equivalents. In addition, all such changes, revisions and modifications that are evident to those skilled in the art will be included with in the scope of the invention as described herein. It should be understood that the preferred embodiments are described to provide the best illustration of the principles of the invention and its practical application to thereby enable one of ordinary skill in the art to utilize the invention in various embodiments, and with various modifications, as are suited to the particular use contemplated.

What is claimed is:

1. A solar tracking system, comprising:
a plurality of solar panels;
a motor;
a flexible transmission shaft rigidly connected to the motor, the flexible transmission shaft comprises at least one tolerance mechanism,
wherein the flexible transmission shaft is configured to rotate;
at least one torsion tube connected to the plurality of the solar panels, the at least one torsion tube comprises a predetermined angle for rotation of the plurality of solar panels; and
a mechanical drive mechanism connected to the at least one torsion tube, wherein the mechanical drive mechanism is rotated by the flexible transmission shaft providing a unison movement of the plurality of solar panels.

2. The solar tracking system of claim 1, wherein the flexible transmission shaft comprises material capable of withstanding forces introduced by the motor and forces introduced by any external loads.

3. The solar tracking system of claim 1, wherein the mechanical drive mechanism comprises a worm gear drive and a worm screw.

4. The solar tracking system of claim 1, wherein the flexible transmission shaft provides compensation for a misalignment between the plurality solar panels and for a non-coaxial alignment between a worm gear drive and a worm screw of the mechanical drive mechanism.

5. The solar tracking system of claim 1, wherein the flexible transmission shaft comprises a flexible material fabricated as a tube, bar, or rod.

6. The solar tracking system of claim 1, wherein the flexible transmission shaft is fabricated from flexible materials selected from metals, wood, and fiber reinforced plastics.

7. The solar tracking system of claim 1, wherein the flexible transmission shaft comprises a measured misalignment of at least three percent of a row distance between at least one adjacent mechanical drive mechanism and the plurality of solar panels.

8. The solar tracking system of claim 1, wherein the plurality of solar panels is configured to move in unison.

9. The solar tracking system of claim 1, wherein the plurality of solar panels comprises a single axis tracking configuration.

10. The solar tracking system of claim 1, wherein the plurality of solar panels comprises a multiple tilt and roll configuration.

11. The solar tracking system of claim 1, wherein the plurality of solar panels comprises a fixed tilt azimuth configuration.

12. The solar tracking system of claim 1, further comprising a damper affixed between the at least one torsion tube and at least one support column supporting the plurality of solar panels.

13. The solar tracking system of claim 1, further comprising a tracker control system capable of:
calculating solar position; and
automatically moving the plurality of solar panels in unison to maximize sun light exposure.

14. The solar tracking system of claim 1, wherein the tolerance mechanism associated with the flexible transmission shaft comprises at least one telescopic length tolerance mechanism.

15. A solar tracking apparatus comprising:
a flexible transmission shaft with a plurality of fixed joints at proximal ends, wherein the flexible transmission shaft comprises a telescoping length tolerance mechanism and a connecting shaft,
wherein the flexible transmission shaft is configured to rotate; and
a mechanical drive mechanism connected to the connecting shaft via a flexible tube;
wherein a plurality of drives associated with the mechanical drive mechanism comprise a first slewing drive and a second slewing drive,
wherein each drive of the plurality divers comprises at least one bending rigid connection,
wherein the flexible tube is comprised of a carbon fiber composite;
wherein each drive of the plurality of drives compensates a predetermined amount of tolerance to accommodate misalignment without limiting operation of a device.

16. The solar tracking apparatus of claim 15, wherein the mechanical drive mechanism is a worm gear drive.

17. The solar tracking apparatus of claim 15, wherein the flexible transmission shaft demonstrates a bending stiffness greater than 3 percent.

* * * * *